US009342829B2

(12) United States Patent
Zhou et al.

(10) Patent No.: US 9,342,829 B2
(45) Date of Patent: May 17, 2016

(54) SYSTEMS AND METHODS FOR MOBILE APPLICATION, WEARABLE APPLICATION, TRANSACTIONAL MESSAGING, CALLING, DIGITAL MULTIMEDIA CAPTURE AND PAYMENT TRANSACTIONS

(71) Applicants: Andrew H B Zhou, Tiburon, CA (US); Wesley Cheng, Palo Alto, CA (US); Dylan T X Zhou, San Gabriel, CA (US); Tiger T G Zhou, Tiburon, CA (US)

(72) Inventors: Andrew H B Zhou, Tiburon, CA (US); Wesley Cheng, Palo Alto, CA (US); Dylan T X Zhou, San Gabriel, CA (US); Tiger T G Zhou, Tiburon, CA (US)

( * ) Notice: Subject to any disclaimer, the term of this patent is extended or adjusted under 35 U.S.C. 154(b) by 0 days.

(21) Appl. No.: 14/815,988

(22) Filed: Aug. 1, 2015

(65) Prior Publication Data

US 2015/0371215 A1 Dec. 24, 2015

Related U.S. Application Data

(63) Continuation-in-part of application No. 13/287,279, filed on Nov. 2, 2011, now abandoned, and a continuation-in-part of application No. 13/343,044, filed on Jan. 4, 2012, now abandoned, and a continuation-in-part of application No. 13/620,775, filed on Sep. 15, 2012, now abandoned, and a continuation-in-part of application No. 13/623,944, filed on Sep. 21, 2012, and a continuation-in-part of application No. 13/760,214, filed on Feb. 6, 2013, now Pat. No. 9,016,565, which is a continuation-in-part of application No. 13/185,491, filed on Jul. 18, 2011, and a continuation-in-part of application No. 12/749,412, filed on Mar. 29, 2010, now abandoned.

(51) Int. Cl.

| | |
|---|---|
| *H04M 1/725* | (2006.01) |
| *G06Q 20/32* | (2012.01) |
| *G06Q 20/38* | (2012.01) |
| *G06Q 20/40* | (2012.01) |
| *G06F 3/041* | (2006.01) |
| *G10L 15/20* | (2006.01) |
| *H04L 29/06* | (2006.01) |
| *G10L 13/02* | (2013.01) |

(52) U.S. Cl.
CPC ........... *G06Q 20/3274* (2013.01); *G06F 3/041* (2013.01); *G06Q 20/3276* (2013.01); *G06Q 20/3829* (2013.01); *G06Q 20/401* (2013.01); *G10L 13/02* (2013.01); *G10L 15/20* (2013.01); *H04L 65/1006* (2013.01); *G06Q 2220/00* (2013.01)

(58) Field of Classification Search
CPC .......... G06Q 20/3274; G06Q 20/3829; G06Q 20/3276; G06Q 20/401; G06Q 2220/00; G06F 3/041; G10L 15/20; H04L 65/1006
See application file for complete search history.

(56) References Cited

U.S. PATENT DOCUMENTS 5,416,730 A * 5/1995 Lookofsky .............. G06F 1/163
361/679.02
8,279,716 B1 * 10/2012 Gossweiler, III . H04M 1/72552
368/10

(Continued)

*Primary Examiner* — Daniel Walsh
(74) *Attorney, Agent, or Firm* — Tran & Associates

(57) ABSTRACT

Systems and method are disclosed for multimedia capture and encrypting using an ephemeral messaging and multimedia application associated with a digital device for secured payment by selecting as a first user input a haptic control for a particular type of multimedia content to be captured; interacting as a second user input with a touch display of the digital device by touching a touch display and holding a touch contact of a user finger or stylus for a predetermined time; capturing multimedia content based on the contact and sending a command to a sensor, of the digital device to capture video and starting a timer to determine a duration of the touch contact of the user with the touch display; and making a secured payment with the digital device.

39 Claims, 22 Drawing Sheets

(56) References Cited

U.S. PATENT DOCUMENTS

| | | | |
|---|---|---|---|
| 8,621,397 B2* | 12/2013 | Chae | H04M 1/72522 455/435.2 |
| 9,098,190 B2* | 8/2015 | Zhou | G06Q 20/3829 |
| 9,100,493 B1* | 8/2015 | Zhou | H04M 1/72522 |
| 2001/0050883 A1* | 12/2001 | Farine | G04G 17/083 368/10 |
| 2004/0187037 A1* | 9/2004 | Checco | G06F 21/31 726/7 |
| 2007/0113207 A1* | 5/2007 | Gritton | G06F 3/017 715/863 |
| 2008/0210754 A1* | 9/2008 | Lovett | G06Q 20/24 235/380 |
| 2008/0318636 A1* | 12/2008 | Kim | G06F 1/163 455/566 |
| 2010/0112964 A1* | 5/2010 | Yi | G04G 21/04 455/90.3 |
| 2010/0332337 A1* | 12/2010 | Bullock | G06Q 20/12 705/26.82 |
| 2011/0059769 A1* | 3/2011 | Brunolli | G08C 17/02 455/556.1 |
| 2011/0205851 A1* | 8/2011 | Harris | G04G 9/0064 368/14 |
| 2011/0246284 A1* | 10/2011 | Chaikin | G06Q 20/105 705/14.38 |
| 2012/0194976 A1* | 8/2012 | Golko | G06F 1/163 361/679.01 |
| 2012/0209749 A1* | 8/2012 | Hammad | G06Q 30/06 705/27.1 |
| 2012/0259780 A1* | 10/2012 | Kang | G06Q 20/3223 705/44 |
| 2013/0080289 A1* | 3/2013 | Roy | G06Q 30/06 705/26.8 |
| 2014/0120983 A1* | 5/2014 | Lam | H04W 84/18 455/557 |
| 2014/0349692 A1* | 11/2014 | Zhou | G06Q 20/3829 455/466 |

* cited by examiner

SYSTEMS AND METHODS FOR MOBILE APPLICATION, WEARABLE APPLICATION, TRANSACTIONAL MESSAGING, CALLING, DIGITAL MULTIMEDIA CAPTURE AND PAYMENT TRANSACTIONS

This application claims priority to Ser. No. 13/760,214 filed Feb. 6, 2013, which in turn is a CIP of Ser. No. 13/185,491, filed on Jul. 18, 2011, and to Ser. No. 12/749,412, filed Mar. 29, 2010 and Ser. No. 10/677,098 which claims priority to Provisional Application Ser. No. 60/415,546, filed on Oct. 1, 2002, the content of which is incorporated herein by reference in its entirety.

BACKGROUND

The present application is related to wearable mobile payment systems and methods.

Mobile payments generally refer to payment operations performed via a mobile or wearable device. The operations performed via mobile and wearable devices may include electronic commerce transactions, retail purchasing, micropayments, and other daily payments. Mobile payments may utilize credit cards, debit cards, gift cards, and virtual currencies. While mobile payments facilitate and stimulate the trade, the procedure of providing financial details and authenticating of identity may be tedious and time-consuming. Therefore, the convenience of mobile payments for daily micropayments is hindered.

Additionally, a mobile or wearable device is often used as an authorization factor, for example, by positioning the mobile device or by sending a one-time code to the mobile device. This allows recognizing and counteracting the credit card data theft and increasing security of mobile payments.

Wireless networks are by their very nature intermittent since you are never guaranteed to have a clear signal. And often, there are places where there is no connection at all. Wireless carriers typically charge for usage of their network by the byte, so it becomes important how much bandwidth is being consumed. And there are multiple networks now available to computers, such as wire-line LAN, WiFi (IEEE 802.11b and successors), Wireless Wide Area Networks (GPRS, 1xRTT), Bluetooth and even a serial cable between a PDA cradle and a PC.

Another new issue raised by the use of mobile computers is the management of the devices and assets on those devices. In the current philosophy of network and system management embodied by software such as HP OpenView and CA Unicenter, there is an assumption that network elements or nodes (eg. computers, routers, switches) are always connected to the network and rarely move. It is therefore straightforward to manage the elements using Simple Network Management Protocol (SNMP) and deploy or update software on those stationary devices. However, with devices that are mobile, there is a new set of issues. These mobile devices are not always connected and if they are, they may be connected to multiple networks and therefore have multiple IP addresses. They might be shared among a group of users (eg. truck drivers who take any arbitrary handheld computer when the start their rounds). The devices must be secure but not impose a heavy price by slowing performance or sending exponentially larger packets on expensive wireless networks.

It is therefore plain that one cannot simply extend the current networking philosophy to computing on intermittent networks. In order to deploy usable and cost-effective client-server solutions that are mission-critical on intermittent networks, the goals should be transactional guarantee and manageability.

Transactional guarantee means that the system must keep functioning regardless of whether there is connectivity or not. No messages should ever be lost but they should be kept in reliable persistent storage at each step so that they can be recovered should a failure occur in the system such as a power outage. The entire system, consisting of the mobile devices and servers, must always be in a consistent state. Even when a failure occurs, the transaction should be rolled back or otherwise compensated so that there are no conflicts in any application. An example of this is when a transaction is to be committed to two applications; if one succeeds and the other fails, the one that succeeded should be rolled back so that they are both consistent. Only when both have succeeded should the transaction be committed. The system should be performant and not allow a fault to throttle the entire system, ie. cause it to stop working or go into an infinite loop and consume a lot of resources. This can happen when a message is in a queue that is fails to be committed to a target application and continues to retry constantly; this is called a "poison message" and should be immediately taken off the queue and processed differently. It should also be very resilient to faults such as badly formatted messages so that the system does not need to be restarted when responding to problems.

Manageability encompasses security, asset management, software deployment and cost control. Security covers the usual areas of authentication, authorization, encryption and non-repudiation. There are many existing technologies that can meet these requirements. Mobile devices have additional requirement of remote locking when a device is reported lost or stolen. This can be done by sending a "poison pill" to kill the device and possibly destroy data or revoking the privilege to connect back to the server when it attempts to do so the next time a connection is available. Asset management refers to tracking the devices (eg. who owns it, where is it) and the management of the configurations on the device (eg. network settings, email settings). It is required that these are done set by a central system administrator and done automatically so that the user is not burdened to set up the configuration, which can be a complex and error prone process requiring much support. Another aspect of asset management is the ability to remotely run diagnostic test programs on the device. For example, the administrator might want to schedule the barcode scanner to be test every day and a report sent automatically when there is a connection so that he knows if the device needs to be brought into the office for maintenance. Software deployment is an area that has received a lot of attention because of the high cost of keeping the correct versions and license of software on computers. This problem is compounded for mobile devices that you cannot physically check. Software deployment configurations must be set up by the administrator remotely, whether the device is connected or not. When a device comes on line, it must automatically know which software to update. The administrator must also be able to specify which network to be used for software deployment. For example, use the free WiFi or serial connection to update software and only use the expensive wireless WAN for sending urgent application messages. Backing up data on the device is also a requirement for devices that have substantial disk storage such as laptops. Cost control is a new requirement for wireless devices where it does matter how much bandwidth is being used. Because wireless networks are more expensive, slower and intermittent, it becomes important for an application to determine which messages should be sent on which networks. Urgent and important messages should be sent on any available network. Less urgent and important messages should wait until a cheaper network is available. Other factors might come into play, such as system or network constraints. For example, if a satellite channel is available, only the most urgent and small messages might be sent. If the time is after 5 pm or the battery is low, perhaps the pending messages should be flushed immediately on any available channel.

SUMMARY

In one aspect, systems and methods are disclosed for facilitating mobile device payments and data exchange using a wearable personal digital device. To facilitate payments, the wearable personal digital (WPD) device may have data associated with one or more payment cards or accounts of the user stored in the memory. To make a payment, the user may request the payment card or account data to be displayed on the display of the WPD device in the form of a barcode. The barcode may be then scanned by a barcode scanner, and the corresponding payment card or account may be charged. The barcode scanner may include a checkout scanner, smartphone, another WPD device, and so forth. Additionally, the WPD device may store other data, such as tickets, boarding passes, coupons, discount cards, membership cards, an identification (ID) card, a driver's license, a permanent resident card, and so forth. This data may be include a barcode and may be displayed on the display of the WPD device on a user request, thus allowing the user to present the data any time without carrying numerous cards, tickets, or passes. Additionally, the WPD device may be used as a personal health and activity monitor. Due to a three-axis accelerometer and one or more sensors, the WPD device may track activity and energy expenditures of the user, for example, measure the number of steps walked, the quality of sleep, and other personal metrics such as blood pressure, pulse, hart rate, arterial properties, and so forth. The data associated with such measurements may be transmitted either wirelessly using Bluetooth, Wi-Fi, and so forth, or via a wire using a USB connection or the like. The data may be transmitted to various external devices, including a personal computer, a mobile device, a tablet PC, and so forth, and be processed there using a special-purpose software. In addition to that, the user may share the data via social networks or other web resources.

In another aspect, computer implemented methods and systems are disclosed for messaging, calling, and one-touch payments via a mobile and wearable device. Using the methods or systems described herein a user may perform fast electronic payments from any location. For this purpose, the user may register with the messaging, calling, and one-touch payment system. During the registration the user may provide his financial information. The financial information may include bank account information, credit card information, debit card information, gift card information, prepaid card information, insurance account information, merchant account information, mobile currency information, digital money account, SDK payment information, in-app payment information, social networking payment information, prepaid card information, API payment information, mobile account payment information, mobile currency information, and so forth. When required, the user may activate an integrated interface of the messaging, calling, and one-touch payment system. The integrated interface may be displayed over the video output of the device and overlap other applications or pages. The integrated interface may provide for selection activity modes including a messaging mode, a calling mode, and a one-touch payment mode. Through the integrated interface the messaging, calling, and one-touch payment system may receive the selection of the activity mode. If the messaging mode is selected, a message from the user may be received and sent to a recipient via a data network. If the calling mode is selected, a data network call may be initiated on a call request of the user. If the one-touch payment mode is selected, a payment request may be transmitted to a financial organization. The payment request may be generated using data of an actual page on the mobile and wearable device and the financial information of the user provided during the registration.

In yet another aspect, systems and methods are disclosed for multimedia capture and encrypting using an ephemeral messaging and multimedia application associated with a digital device. According to the method, a first user input is received. Based on the first user input, one or more sensors are initiated to capture multimedia to obtain captured multimedia. The method further comprises receiving a second user input. Upon receiving the second user input, data associated with the first user input and the second user input are analyzed. Based on the analysis, one or more multimedia types are selected for recording from the captured multimedia based on predetermined rules. The selected one or more multimedia types are recorded to a memory. The recorded multimedia types are modified by a cloud-based voice changing unit. Furthermore, the one or more of the recorded multimedia types and the modified multimedia types are encrypted to prepare the one or more multimedia types for sending to an intended recipient.

In a further aspect, a system is disclosed for multimedia capture and encrypting using an ephemeral messaging and multimedia application associated with a digital device. The system comprises one or more processors. The processors are operable to receive a first user input. Based on the first user input, the processors initiate one or more sensors to capture multimedia. The processors are further operable to receive a second user input. Upon receipt of the second user input, the processors analyze data associated with the first user input and the second user input. Based on the analysis, the processors the processors to select one or more multimedia types for recording from the captured multimedia based on predetermined rules. The processors are further operable to record the selected one or more multimedia types to a memory. The system further comprises a cloud-based voice changing unit operable to modify the one or more recorded multimedia types to obtain one or more modified multimedia types. Furthermore, the system comprises an encryption unit operable to encrypt the one or more of the recorded multimedia types and the modified multimedia types to prepare the one or more multimedia types for sending. The system further comprises one or more sensors and a memory. The sensors are operable to capture multimedia to obtain captured multimedia. The memory is operable to store the one or more multimedia types.

In yet another aspect, a system includes a server; a plurality of wireless networks coupled to the server; and one or more mobile devices coupled to the wireless networks with intermittent access to the wireless networks, the plurality of wireless networks providing messaging between client and server applications over multiple intermittent connections.

Implementations of the above aspect can include one or more of the following. The system provides bi-directional transactions between wireless/mobile devices and enterprise server applications. Transactions are achieved between client and server by breaking up the sequence such that the client does not have to wait until the transaction is completed before relinquishing the network connection. By using asynchronous messaging, the message is persisted at every step and can be handed off to the next stage without waiting. The reply from the server comes back to the client as an asynchronous message and completes the transaction. Bi-directional messaging is achieved using server-initiated push techniques such as modem signaling, http listener, SMS or polling using an efficient decaying algorithm. Messages are sent via communication channels that can be a combination of a physical network and a service provider. Networks are automatically detected by observing changes in the TCP/IP route table and configured by altering the default route. Service providers are determined by using identification servers accessible only in specific networks; if reachable, then it is that network. Transmission rules are formed using regular expressions to combine system, message and channel parameters. These are changed at any time and sent dynamically as system messages to target devices. Conflict-free database synchronization is achieved by assigning a master database and making the others slave databases whose updates are considered pending until confirmed by the master database. A lightweight LUCID (Logic Up, Consistent Information Down) model works by sending acknowledgement messages instead of the entire reply record.

One embodiment enables computing devices (including devices acting as clients, servers or both) using intermittent networks to have the same quality of service as traditional LAN-based transactional systems but doing so in a much more efficient manner. It also addresses the challenges of using multiple networks that have different costs associated with them. In order to achieve these objectives, one embodiment is to use current distributed transactional processing theories and rework the sequence diagrams so that each step of the process is self contained and does not depend on holding on to a constantly connected network in order to receive the acknowledgements. The use of asynchronous messaging with the once-and-only-once policy is the underlying infrastructure for the system. Therefore, a device using an intermittent network can send a message and once it is assured that it has been received on the other end, it does not need to keep the connection open. The method involves the assignment of a queue for each user/device, a queue for each server application, and a set of system queues for audit and exemption handling. By automatically creating these queues, the system makes it very simple and straightforward for any entity to create transactional applications without a lot of knowledge about messaging or transactions.

With the advent of devices that use multiple networks, some of which might be intermittent like wireless networks, this invention uses policy-based routing to enable the administrator of a corporation to dynamically select which networks to use for which messages. This will allow small urgent messages to be sent via expensive wireless and larger less urgent messages to be sent by cheaper networks. Since the dominant network protocol TCP/IP abstracts the lower-level layers, it is not possible to achieve this without first identifying and configuring each network. In addition, a network is accessed via a physical Network Interface Card (NIC) that might be used to access different services, like a WiFi card can be used for both a free campus network and a commercial service used at a café. Different combinations of NICs and service providers enable different communication channels. The service that is currently active can be determined by using identification servers in the different networks that are only addressable when that particular service provider is active. Then a set of rules can be created for a set of devices and sent to them dynamically using the same asynchronous messaging mechanism as for the transactions. The rules can be based on system parameters (time, memory, power), or message parameters (priority, size), or channel parameters (cost, speed), or historical data. These system messages are intercepted on the device by the management agent that creates a set of rules that are evaluated whenever there are messages to be sent and at least one channel is available.

In order to achieve database synchronization that does not have any synchronization conflicts, it is necessary to first assign a master application that is the final arbiter of database operations (create, read, update, delete). All other databases are considered slaves and their database operations are considered "pending" until they have been verified and acknowledged by the master application. Therefore, when a connection is available and the synchronization is started, the slave database is tagged "in flight" and the master updates its database accordingly. Then the entire updated record is sent back to the client and then and only then is it marked complete. Conflicts do not occur because the client must update its database based on the record sent back by the server, even if this is the update that is sent. The application can then decide to send a new update or leave it as is. In any case, the master and slave databases are always in sync. This is known as the LUCID (Logic Up, Consistent Information Down) model, which was first put forth by the Informix (now IBM) Cloudscape project. LUCID was developed for databases that occasionally connect and sync up.

In applying this to intermittent networks, the lightweight LUCID model is prescribed, as discussed in greater detail below. This is the same as LUCID going up—data is processed using business logic, however, there is no requirement for the consistent server image to be sent back to the device. The server can just send an acknowledgement using a separate asynchronous messaging channel to indicate the data was received and process or a 'fault' to indicate any problems. This is much more efficient and allows real-time consistent database synchronization.

In order to create loosely coupled client-server applications, an integrated development environment (IDE) needs to be cognizant of the transaction model used. The method described in this invention involves the use of declarative programming to define the structure of the client and server without any coding. This is achieved by a methodology for untethering the client application from the server. The first step is defining a standalone client application with its own database that operates regardless of the existence of a connection to the server. The second step is to define the server portion (eg. Java Bean or Web Service client) using the widely used Model-View-Controller pattern that acts like a tethered client to the backend applications. The final step is to define the messages between the client and server portion. The graphical user interface is defined by mapping the business objects to graphical objects.

An integrated system that includes the deployment of the client and server software to the appropriate client and server devices simplifies the typical separate development and deployment processes. By defining a single package consisting of the client, the server and gateway URL (the address of the queue that identifies the server application), there is consistency built into the process because the relationships are strongly enforced and not allowed to be broken. The deployment system also allows the assignment of arbitrary applications to groups of users who have different types of devices. The system first defines the users and groups, and then assigns devices to users. Devices belong to a platform that designates a group of operating systems that can run the same programs (eg. Windows 2000, Windows XP). Then packages are defined and linked with groups. The system figures out which devices should get which applications by matching the application platform and ensuring that devices only get applications that are targeted for the correct platform.

There are several methods to achieve server-initiated push messaging to remote clients. If the device operating system or network interface card (eg, wireless modem) provides a way to signal the device and invoke a program, then this can be used to wake up the client so that it pulls messages from the server. If the device is addressable, then a small listener application can be running on the device so that the server can send a message to that listener to wake up the client application to pull messages. Finally, even if the abovementioned are not available, the device can poll for messages using various algorithms to increase the chances of getting messages while reducing the bandwidth. One algorithm is the decaying algorithm that increases its polling frequency whenever a message is sent because it expects a response from the server. When no messages are being sent or received, it reduces the frequency so that it can save bandwidth To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

Embodiments are illustrated by way of example and not limitation in the figures of the accompanying drawings, in which like references indicate similar elements and in which.

DETAILED DESCRIPTION

Figure 1:
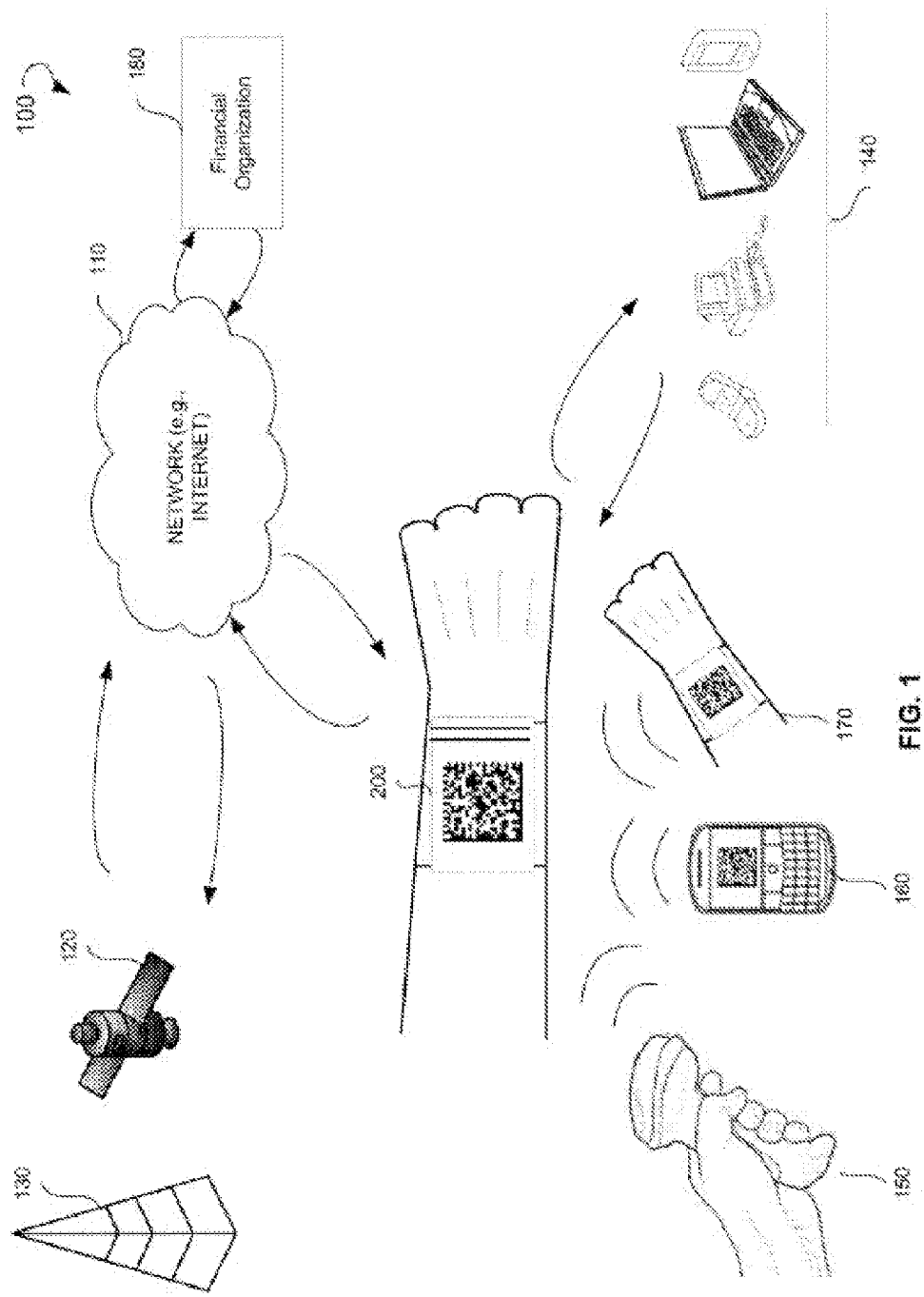
FIG. 1 illustrates an environment within which the wearable personal digital device and methods for facilitating mobile device payments using the wearable personal digital device can be implemented, in accordance to some embodiments.

A wearable personal digital device for facilitating mobile device payments and personal use and related methods are described herein. The wearable personal digital (WPD) device facilitates payments and data exchange by generating and/or displaying barcodes encoding payment information or other data on a display of the WPD device. Being worn on a wrist, the WPD device may provide for convenient carrying in many situations and environments, such as physical activity, sports, travels, leisure time, and so forth.

A user may store his payment information (i.e. payment account number, payment card, and so forth) on the WPD device. For a mobile payment, the user may request to provide the payment information. The payment information may then be encoded in a barcode and displayed on the display of the WPD device for scanning by a barcode reader, a smartphone, another WPD device, and so forth. The barcode may include various types of optical codes, such as a Unified Product Code (UPC) represented as a barcode and/or an alphanumeric string, an Electronic Product Code (EPC) encoded as a printed barcode or encoded on Radio Frequency Identification (RFID) tag, or any other variations of linear barcode, two dimensional or matrix barcodes, a snap tag code, a QR code, alphanumeric string (e.g., 8-bit, 16-bit, 32-bit string), electronically encoded codes (e.g., 96-bit strings), and so forth.

Another possible use of the WPD device may be receiving information, such as discount cards, membership cards, tickets, boarding passes, an identification (ID) card, a driver's license, a permanent resident card, and so forth. The information may be presented as or related to barcodes, encoded in barcodes, and so forth. For example, the user may store a cinema ticket in the form of a barcode on the WPD device and produce the ticket by displaying it on the display of the WPD device.

The information may be received wirelessly or by wire, by capturing an image of a discount card, ticket, boarding pass, advertising materials, and so forth. Such information may be stored on the WPD device for future usage (producing a ticket or a discount card), or the information may be retrieved from a barcode to be shown on the display of the WPD device. For example, the user may scan a barcode presented on an advertising leaflet to get additional information encoded in the barcode. The barcode may be resolved by the WPD device, and the information encoded in the barcode may be shown on the display of the WPD device for the user. In some case, the information encoded in the barcode may include a link to a web-resource. Then, after resolving the barcode the WPD device may access the web-resource and display the web-resource to the user.

In addition to that, the information retrieved from a scanned barcode may be a payment request. The payment request may include payment related information, such as receiving account, bank of the receiver, and so forth. An amount to be paid may be encoded in the barcode or provided by the paying user. Thus, users of the WPD devices may make payments to a merchant by scanning a barcode that encodes a payment request and approving the payment request retrieved from the scanned barcode. Additionally, users of the WPD devices may make payments between themselves using the WPD devices, the WPD device of the payment receiver generating and displaying corresponding barcodes, and the WPD device of the payer scanning and processing the barcode.

Furthermore, the WPD device may perform a function of a health and activity monitor. The WPD device may sense biometric data associated with the user (blood pressure, pulse, heart rate, and so forth) using one or more sensors and/or receive data on user movements using a GPS module and/or one or more accelerometers. Biometric data and user movement data may be shown of the display of the WPD device, stored in the memory of the WPD device, and/or processed by the processor of the WPD device to produce historical or averaged data.

Referring now to the drawings, FIG. 1 illustrates an environment 100 within which the wearable personal digital (WPD) device 200 and methods for facilitating mobile device payments using the wearable personal digital device 200 can be implemented. The environment 100 may include a network 110, a wearable personal digital (WPD) device 200, a mobile base station 130, a GSM satellite 120, one or more external devices 140, another WPD device 170, a mobile phone 160, a barcode scanner 150, and a financial organization. The network 110 may include the Internet or any other network capable of communicating data between devices. Suitable networks may include or interface with any one or more of, for instance, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular digital packet data), RIM (Research in Motion, Limited) duplex paging network, Bluetooth radio, or an IEEE 802.11-based radio frequency network. The network 110 can further include or interface with any one or more of an RS-232 serial connection, an IEEE-1394 (Firewire) connection, a Fiber Channel connection, an IrDA (infrared) port, a SCSI (Small Computer Systems Interface) connection, a USB (Universal Serial Bus) connection or other wired or wireless, digital or analog interface or connection, mesh or Digi® networking. The network 110 may be a network of data processing nodes that are interconnected for the purpose of data communication. The WPD device 200 may communicate with the GPS satellite via the network 110 to exchange data on a geographical location of the WPD device 200. Additionally, the WPD device 200 may communicate with mobile network operators using the mobile base station 130.

As shown, the WPD device 200 may be configured to display a barcode scannable by the barcode scanner 150, mobile phone 160, a checkout scanner, a check-in scanner, or another WPD device 170. Various examples of barcodes are described above. The WPD device 200 may communicate with the network 110 to retrieve information encoded in one or more barcodes, exchange data with the financial organization 180 to process mobile payments. Additionally, the WPD device 200 may communicate with the one or more external devices 140. The one or more external devices 140 may include a mobile phone, a smartphone, a tablet PC, a lap top, a personal computer, a digital eyeglass device, another WPD device, and so forth. Communication with the one or more external devices 140 may be via the network 110 wirelessly or by wires using various connections such as a universal serial bus (USB) port, a parallel port, an infrared transceiver port, a radiofrequency transceiver port, and so forth. Such communication may be used to exchange or store data, manage data stored on the device, synchronize data. In some embodiments, the WPD device 200 may synchronize with the one or more external devices in real time to exchange data. Additionally, the user of the WPD device 200 may communicate with others using an embedded emergency button. The emergency button may be used by senior people, children, people having health problems to request for help in case of health or other troubles, give an alert or another informational signal, or to exchange information with friends, relatives, medical institutions, and so forth.

For the purposes of communication, the WPD device 200 may be compatible with one or more of the following network standards: GSM, CDMA, LTE, IMS, Universal Mobile Telecommunication System (UMTS), 4G, 5G, 6G and upper, RFID, and so forth.

Figure 2:
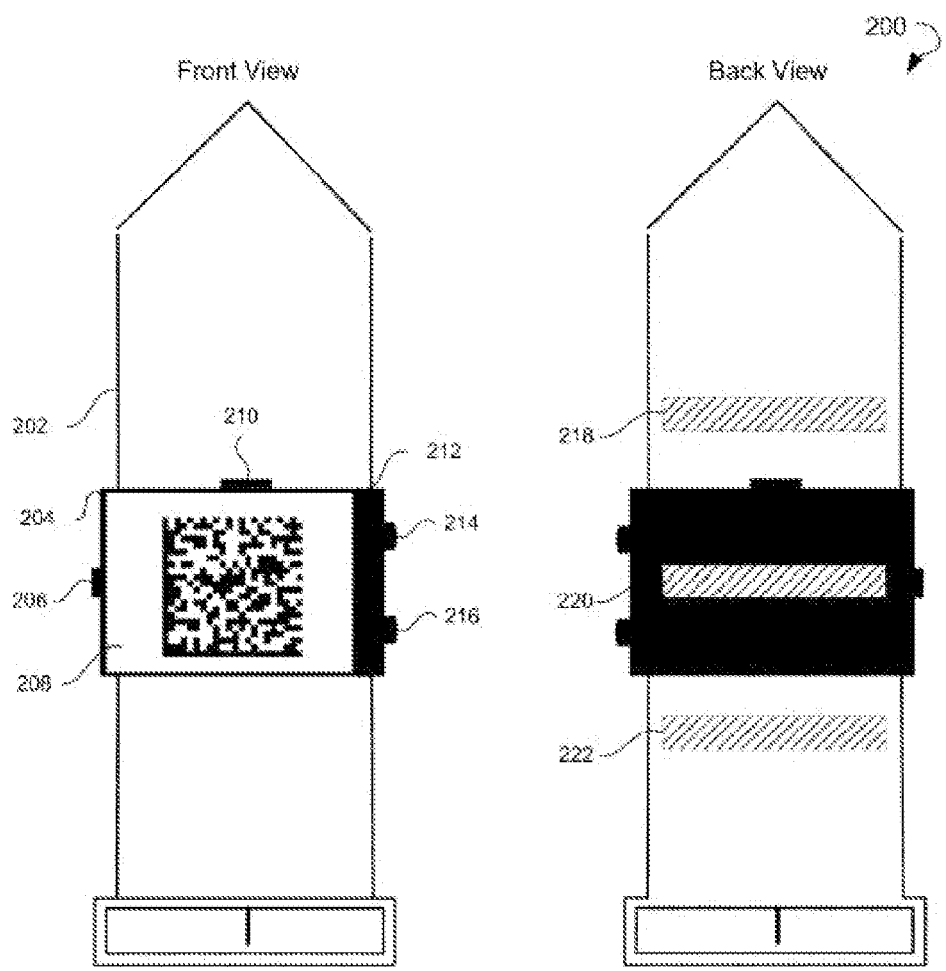
FIG. 2 illustrates an example of the wearable personal digital device, in accordance to some embodiments.

FIG. 2 illustrates an example of the WPD device 200 in accordance to some embodiments. The WPD device 200 may comprise a housing 204, which encloses a processor (not shown), a memory unit (not shown), a timepiece module (not shown), a communication circuit (not shown), a display 208, a camera 210, one or more control elements 214, 216, a swipe card reader 212, and a connection port 206, attached to a band 202. The processor may be configured to generate, based on payment data, personal data, or other data, one or more barcodes encoding the payment data, the personal data, or the other data; and provide, on a user request, one or more of the following: the one or more barcodes, the payment data, the personal data, or the other data. In some embodiments, the WPD device 200 may be further configured to download, install, and run applications, receive and send text, video, multimedia data, and perform other operations.

The memory unit may be communicatively coupled to the processor and configured to store at least the payment data, the personal data, and barcode information. The timepiece module may be communicatively coupled to the processor and configured to provide time data.

The display 208 may include a touchscreen display or any other type of display. The display 208 may be communicatively coupled to the processor and configured to graphically display one or more of the following: the payment data, the personal data, the barcode information, one or more barcodes (for example, payment barcodes), and the time data. Displaying a barcode may involve processing information to encode into a barcode image. A barcode may encode and store the payment data, the personal data, group of payment data, credit card data, debit card data, gift card data, prepaid card data, bank checking account data, digital cash data, and other data. The local processing may be performed by the processor using various software applications installed on the WPD device.

In some embodiments, the user may give a command to generate and display a barcode encoding payment data to make a payment in a retail environment. For example, the user may scan one or more product barcodes using the WPD device 200 and, based on the data retrieved from the product barcodes, cause the WPD device 200 to generate a payment barcode to purchase the products, the barcodes of which were scanned. Thus, the WPD device 200 may enable self-checkout by scanning product barcodes and generating a barcode encoding payment data of the user (a payment barcode) that may be provided for scanning by the user. The barcodes displayed by the WPD device may be scannable by a barcode scanner, a checkout scanner, a check-in scanner, an external device, another wearable personal digital device, and on forth.

In some embodiments, the display 208 may be configured to enable user interaction with the device through touch.

In a locked state, the WPD device 200 may display time provided by the timepiece module. On a request of a user, the WPD device may provide data stored in the memory unit of the device. In various examples, such data may include payment information of the user in the form of a scannable barcode, discount or membership cards of the user, tickets, coupons, boarding passes, and on forth. For receiving data, managing stored data, communicating and/or synchronizing with a cloud application, an external device, such as a PC, a laptop, a smartphone, a tablet PC, and an forth, the WPD device 200 may connect with a could application, a network, or external device using a wireless connection or by wires.

The camera 210 may be communicatively coupled to the processor and configured to scan a barcode. Scanning a barcode may involve capturing an image of the barcode using the camera 210. The scanned barcode may be processed by the processor to retrieve the barcode information. Using the camera of the WPD device, the user may capture pictures of various cards, tickets, or coupons. Such pictures, stored in the memory of the WPD device, may comprise data related to captured cards, tickets, or coupons. Additionally, the camera 210 may be configured to capture photos and record video.

In some embodiments, the camera 210 may be detachable and pluggable to a digital eyeglass device.

One having ordinary skills in the art would understand that the term "scanning" is not limited to printed barcodes having particular formats, but can be used for barcodes displayed on a screen of a PC, smartphone, laptop, another WPD device, and so forth. Additionally, barcodes by be transmitted to and from the WPD device electronically. In some embodiments, barcodes may be in the form of an Electronic Product Code (EPC) designed as a universal identifier that provides a unique identity for every physical object (not just a trade item category) anywhere in the world. It should be noted that EPCs are not exclusively used with RFID data carriers. They can be constructed based on reading of optical data carriers, such as linear barcodes and two-dimensional barcodes, such as Data Matrix symbols. For purposes of this document, all optical data carriers are referred to herein as "barcodes."

As stated, the WPD device 200 may have wireless communication capabilities enabled using at least the communication circuit. The communication circuit may be communicatively coupled to the processor and configured to communicate with one or more external devices via a network wirelessly of by wires using one or more of the following: a Bluetooth module, a WiFi module, the communication port 206, including a universal serial bus (USB) port, a parallel port, an infrared transceiver port, a radiofrequency transceiver port, and so forth. The WPD device 200 may have internet connectivity using cellular networks (e.g., 3G, 4G) as well as Wi-Fi and other types of networks. Some additional examples of such networks are GSM, CDMA, LTE, IMS, Universal Mobile Telecommunication System (UMTS), RFID, 4G, 5G, 6G and upper.

The WPD device 200 may further comprise an operating system executing on the processor. The operating system may include Android, iOS, Firefox OS, and so forth.

The one or more control elements 214, 216 may include buttons, wheels, sliders, and so forth. The one or more control elements 214, 216 may be used to control operation or functions of the WPD device 200.

The band 202 may be attached to the housing to and adapted to secure the WPD device 200 on a body or clothes of the user. In various embodiments, the WPD device 200 may be secured on a wrist, an arm, a neck, a head, a leg, a waist, or any other part of the human body, or on any part of the clothes of the user. The band 202, in various embodiments, may be implemented in various materials and/or conFIGurations. The band 202 may be an expansion bracelet, one piece band, two piece band, and so forth. In some embodiments the band 202 may include a clasp adapted to fix the band 202 in a specific position to secure the WPD device 200 around the wrist. The clasp may include various types of clasps, buckles, tongue clasps, lobster claws, toggle clasps, Velcro, and so forth.

In some embodiments, the band 202 may be adapted to be filled with air to perform blood pressure measuring and may include a pressure adjustment device.

Additionally, in some embodiments, one or more solar cells may be disposed on the outer surface of the band 202. The solar cells may be electrically connected to a battery of the WPD device 200 and may be configured to charge the battery of the WPD device 200. In other embodiments, the WPD device 200 may be configured to charge using natural movement vibrations, for example, when the user walks, is jogging, makes exercises, and so forth. In yet other embodiments, the WPD device 200 may charge wirelessly using an external wireless charger accessory.

In various embodiments, the WPD device 200 may be metal-banded, leather banded, plastic-banded, jewelry-banded, rimmed by jewelry and/or diamonds on a bezel, rimmed by jewelry and/or diamonds on an edge of the display, and so forth.

Additionally, the WPD device 200 may include the swipe card reader 212 to read payment cards data. The swipe card reader 212 may be located on either side of the WPD device 200, vertically or horizontally.

In some embodiments, the WPD device 200 may include one or more accelerometers to track activity of the user for purposes of monitoring energy expenditures or calories burned, evaluating sleep quality, calculating breaths per minute, snoring breaks, steps and/or distance walked, and so forth.

In some embodiments, the WPD device 200 may sense biometric parameters, such as blood pressure, pulse, hart rate, arterial properties of the user, the quality, of sleep, using one or more sensors 218, 220, 222. The one or more sensors 218, 220, 222 may include one or more of the following: a heartbeat rate meter, a glucose level meter, a pressure sensor, body temperature meter, environment temperature meter, one lead EGO, and so forth. The biometric parameters sensed by the one or more sensors 218, 220, 222 may be shown on the display 208, stored to the memory, and/or processed by the processor to receive historical or averaged biometric data. In various embodiments, the one or more sensors 218, 220, 222 may be located in various locations such as to ensure a secure contact with the user skin or to avoid it depending on the parameter sensed by a sensor.

In some embodiments, access to the WPD device 200 may be protected by a password, a Personal Identification Number (PIN) code, biometric authorization, and so forth. Biometric authorization may be performed using one or more biometric sensors and may include fingerprint scanning, palm scanning, face scanning, retina scanning, and so forth. In some embodiments, fingerprint scanning may be performed using a fingerprint reader integrated in the WPD device 200 or detachably connected to the WPD device. The scanned fingerprint may be matched to one or more approved fingerprints stored in the memory of the WPD device 200. The access to the device may be granted if the scanned fingerprint matches one of the stored fingerprints, otherwise access may be denied.

In certain example embodiments, the WPD device 200 may sense and track position of the user to control snoring of the user by means of one or more accelerometers and/or biometric sensors.

In further embodiments, the WPD device 200 may be used to record, send, receive, and review texts, images, video, audio, photo, multi-media, and other data.

The WPD device 200 may further include a GPS module (not shown) configured to track geographical location of the device. Such information may be applied for spatial and positional awareness tracking, monitoring position of a child, a senior, or a patient. In some embodiments, the WPD device 200 may connect to one or more external devices (for example, other WPD devices) and send data on own geographical location and receive data on geographical location of the one or more external devices. Thus, users may track geographical location of each other.

Additionally, the WPD device 200 may include an alert unit (not shown) configured to alert the user about one or more events by vibration and/or sound. For example, the WPD device 200 notify the user about incoming messages and/or data, remind to take pills, alert the time when blood pressure and glucose level of the user are high, remind to make exercises, serve as an alarm clock, and so forth.

In some embodiments, the WPD device 200 may further comprise one or more subscriber identification module (SIM) cards that can be used for connectivity and other purposes. Also, the WPD device 200 may include one or more additional memory units to expand storage capacity of the device. In some embodiments, the WPD device 200 may offer options for expandable memory by including a physical interface configured to receive memory devices external to the device. In some embodiments, the physical interface may include an external miceSecureDigital (microSD) slot. Aside from microSD slot, the WPD device 200 may provide for adding an external memory device using other interfaces such as, for example, MultiMediaCard (MMC), SD, miniSD, Firewire, and others.

Moreover, a two way radio transceiver (not shown) may be included in the WPD device 200 for communication and personal emergency response as well as entertainment use.

To provide for giving an alarm signal in case of danger or when help is needed, the WPD device 200 may comprise an emergency button. The emergency button may be used by children, seniors, patients, and so forth. The alarm signal may comprise a signal sent to an external device connected with the WPD device 200, a sound signal generated by the WPD device 200, a light signal, another signal, or a combination of them.

In some example embodiments, the WPD device 200 may further comprise a microphone (not shown). The microphone may be configured to sense voice data and transmit the voice data to the processor for processing. The voice data may include a voice command, a voice memo, a voice message, and so forth. Thus, a user may give voice commands to the WPD device 200, for example, when jogging, record voice memos, send voice messages, and so forth.

In some embodiments, the WPD device 200 may be waterproof, dust-proof, and/or shock-proof.

Figure 3:
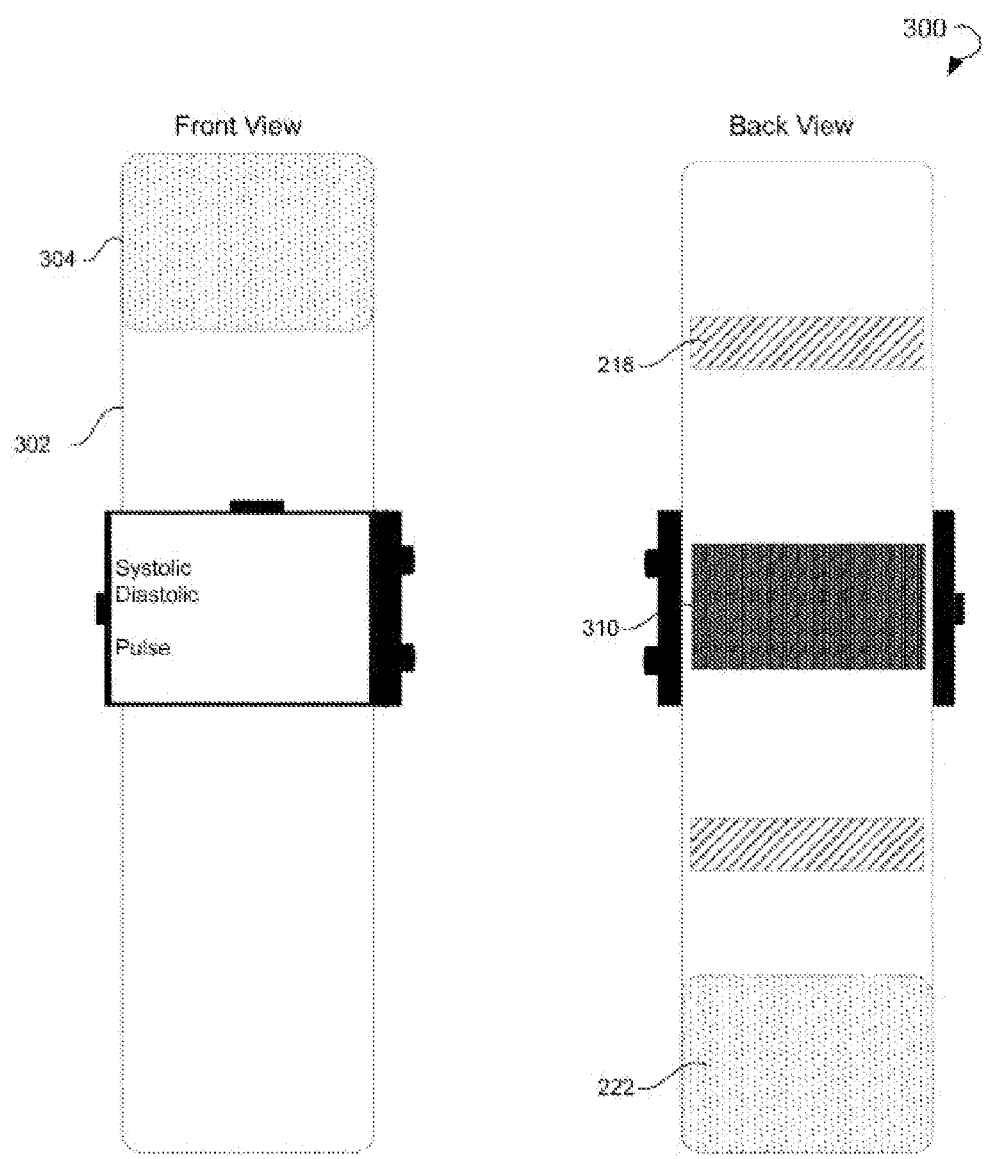
FIG. 3 illustrates an example of the wearable personal digital device adapted to monitor health and activity, in accordance to some embodiments.

FIG. 3 illustrates an example of the WPD device adapted to monitor health and activity 300, in accordance to some embodiments. The WPD device adapted to monitor health and activity 300 may include an inflatable cuff 302 serving as a band. The inflatable cuff 302 may be secured on a wrist using Velcro fastening 304, 306. To measure blood pressure the inflatable cuff 302 may be inflated/deflated using a pressure adjustment device 310. Inflation/deflation may be performed automatically, after the user gives a command to measure blood pressure. Biometric parameters may be sensed by one or more sensors 218, 222 described above. The results of the measuring may be shown on the display and/or stored to the memory of the device to track pressure changes. The biometric parameters of the user may be processed by the processor to provide data on estimated trends of some parameters, such as progress bars, graphs, charts, and so forth.

In some embodiments, the WPD device may be configured to provide good habits charts capabilities. Such charts may enable the user to set a goal (e.g. eat healthy food, make one's bed in the morning, and so forth) and view progress in its achieving by registering events that comply with the goal set. The goals set, progress and/or results may be sent to a social networking service to share and get feedback. If an event complying with the set goal is not registered, the WPD device may give an alert signal, for example, by vibration, sound, light, and so forth.

In some embodiments, data related to biometric parameters of the user may be transmitted wirelessly to one or more external devices and/or online services.

In some embodiments, the WPD device adapted to monitor health and activity 300 may be configured to continuously monitor biometric parameters of the user and produce an alarm or otherwise notify the user when one or more of the biometric parameters exceed predetermined limits.

Figure 4:
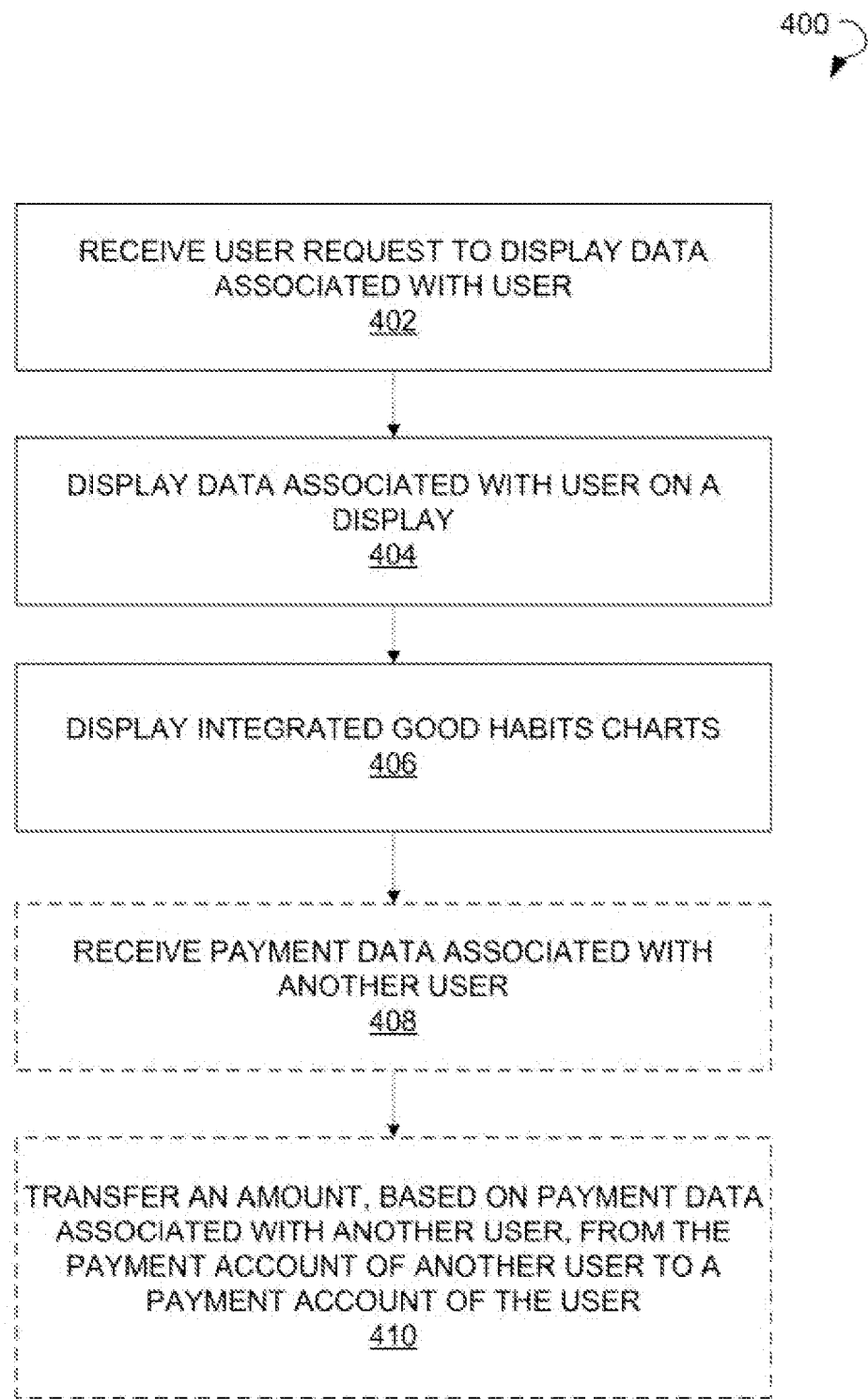
FIG. 4 is a flow chart illustrating a method for facilitating mobile device payments using a wearable personal digital device, in accordance with certain embodiments.

FIG. 4 is a flow chart illustrating a method 400 for facilitating mobile device payments using a wearable personal digital device, in accordance with certain embodiments. Method 300 may start with receiving a user request to display data associated with a user at operation 402. The data to be displayed may be stored in a memory unit of the WPD device or on a data server, in the latter case the data to be displayed may be transmitted from the data server to the WPD device. The user may send the request to display data using one or more control elements of the WPD device and/or touchscreen interface.

Based on the user request, the data associated with the user may be displayed on a display of the WPD device at operation 404. The data may be displayed in the form of a barcode scannable by a checkout scanner, check-in scanner, a mobile device, a camera, another WPD device, and so forth. The barcode may be generated by the WPD device or stored in the memory of the WPD device.

The data may include payment data, personal data, time data, or health and activity data associated with the user. The payment data may include a barcode encoding information related to a payment account of the user, payment amount, bank of the payment account, and so forth. Thus, the user may make a payment by showing a barcode encoding payment data that may be scanned, for example, by a barcode scanner instead of a payment card in a retail environment. Personal data associated with the user may include a ticket, a boarding pass, a coupon, a discount card, a membership card, and the like. The user may produce such data on a display of the WPD device to get a discount, activate a coupon, get access to a sports club, and so forth.

In some embodiments, the barcode displayed by the WPD device (e.g. QR code) may encode electronic key data to enable entry in locked premises. Such barcodes may be used to enter home rooms, office rooms, hotel rooms, and so forth. To enter a locked room, the user may provide a key barcode displayed on a display of the WPD device to be scanned by a web-camera of an access control system. The barcode scanned by the web-camera may be transmitted to the access control system to retrieve the key encoded by the barcode and find the key in a database of approved keys. If the key is found in the database, the access control system may grant the user access to the room and unlock the door. Thus, the WPD device may store electronic keys for various premises, cars, storages, and so forth allowing the user to avoid carrying a chain of keys to meet any emergence.

In some embodiments, the WPD device may be configured to display health and activity data associated with the user. On a user request, the WPD device may measure various biometric parameters of the user, display the biometric parameters on the display of the WPD device, and/or store the measured parameters in the memory. Additionally, the biometric parameters may be processed to receive summary data.

Additionally, the method 400 may include displaying integrated good habits charts on a display of the WPD device at operation 406. The good habits charts may be configured to receive, from the user, information on one or more set goals. For example, the user may set a goal to jog every morning, to smoke no cigarettes during a day, to have lunch in time, and on forth. One the goal is set, the user may provide data on events complying with the one or more set goal. In the example with the jogging, the user may mark every morning that the jogging was made. The WPD device may remind the user about the set goal. For example, the device may give an alert signal in the time specified for the set goal or give an alert signal, if the user has not marked an event complying with the one or more set goal. An alert signal may include vibration, sound, light, and/or a voice message.

Based on the events marked or not marked by the user, the WPD device may calculate user progress in achieving the one or more set goal. The user progress may be shown by various charts, tables, diagrams, graphs, and so forth. When the progress is good, the good habits charts may provide praises or compliments to the user. Moreover, the WPD device, on a user request, may transmit information related to the one or more set goal or the user progress to a social networking service to share progress and/or receive comments from user contacts in the social networking service.

Optionally, the method 400 may include receiving payment data on another user at operation 408. In some embodiments, the payment data associated with another user may be received on scanning a printed barcode or a barcode displayed on a screen of a PC, laptop, smartphone, WPD device on another user, and so forth. For example, the barcode may be scanned by capturing an image of the barcode using the camera of the WPD device. This image may be then processed by the WPD device to retrieve information encoded in the barcode. Further processing is described in more detail with reference to FIGS. 5-6.

Based on the payment data associated with another user retrieved from the barcode, at operation 410 the WPD device may give a command to transfer an amount from the payment account of another user to a payment account of the user based on the retrieved data. Information on the payment account of the user receiving the payment may be stored in the memory unit of the WPD device.

Figure 5:
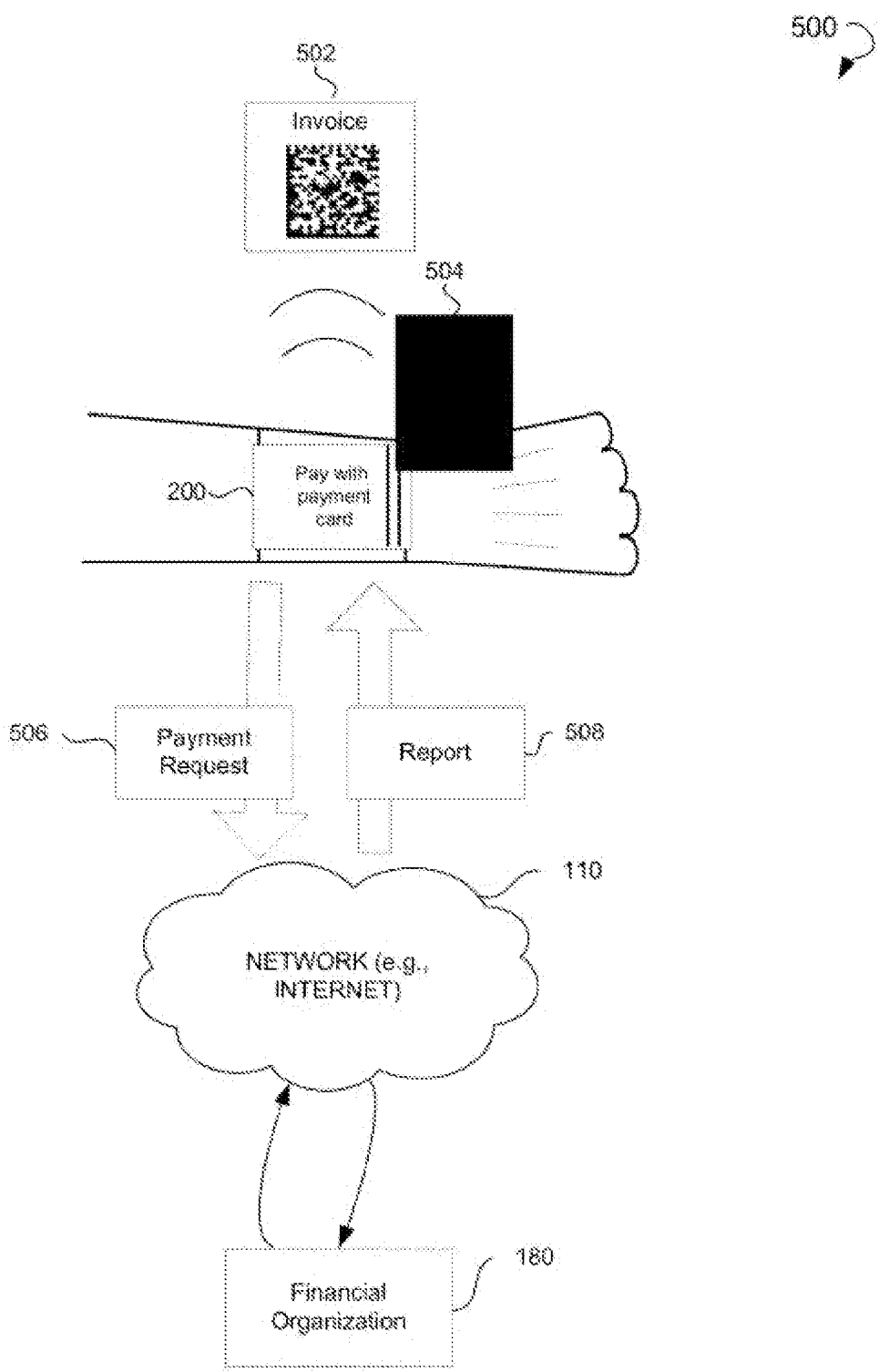
FIG. 5 shows mobile with the wearable personal digital device payment using a payment card, in accordance to some embodiments.
Figure 6:
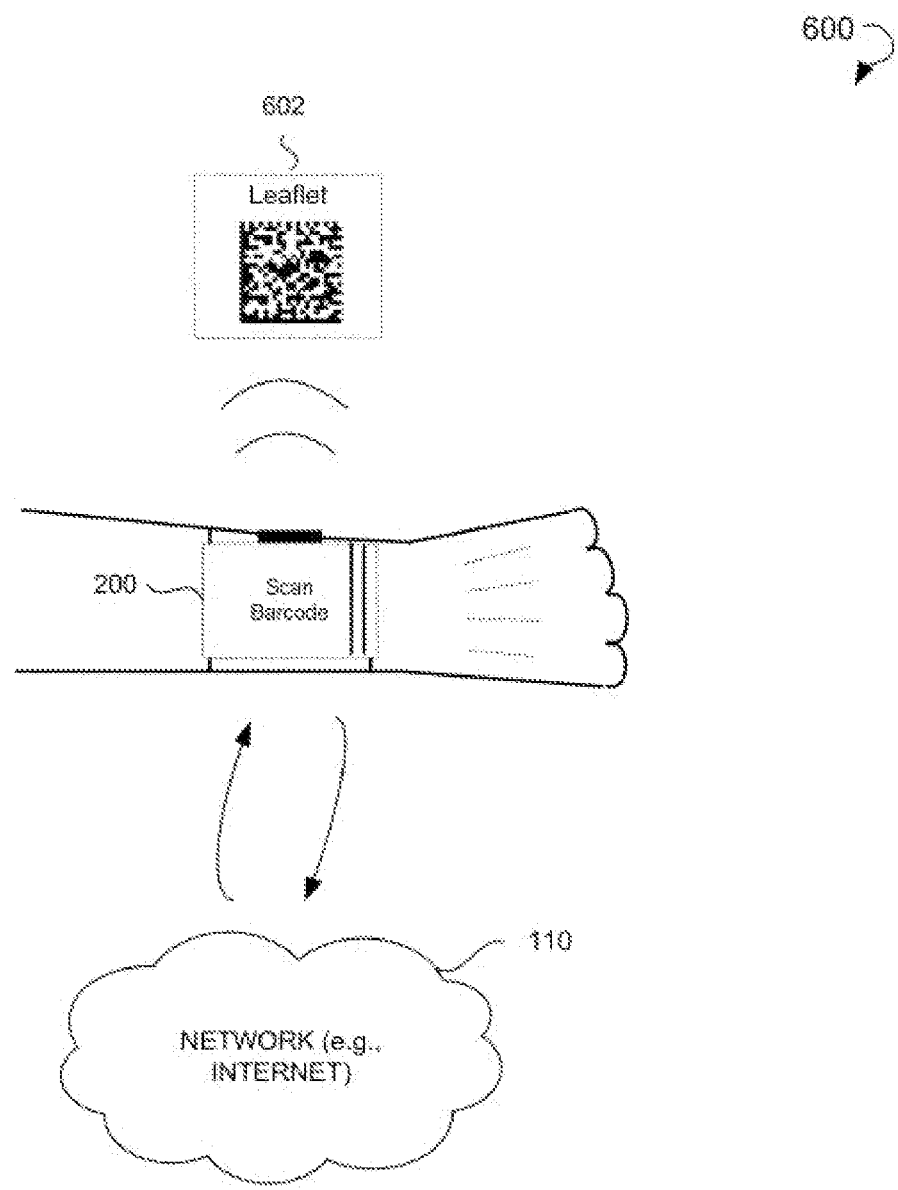
FIG. 6 shows data exchange using the wearable personal digital device, in accordance to some embodiments.

One example embodiments of method 400 will now be illustrated by FIGS. 5-6.

FIG. 5 shows payment 500 using a payment card, in accordance to some embodiments. The user may receive invoice data by scanning a barcode of an invoice 502 using a camera of the WPD device 200. The invoice 502 may encode payment request information, such as receiving account, amount to be paid, and so forth. However, in some embodiments, the amount to be paid may be provided by the user.

To pay the invoice 502, the user may choose to pay electronically using the payment data stored on the WPD device or by a payment card 504. To pay using the payment card 504, the user may swipe the payment card 504 via the swipe card reader of the WPD device. On swiping the payment card 504, the WPD receives payment data associated with the payment card 504 and generates a payment request based on the payment data associated with the payment card 504 and the payment request information of the invoice 504. Based on the payment request information and payment data associated with the user, the WPD device may send a payment request 506 to a financial organization 180 associated with the payment data associated with the payment card 504.

The payment request 506 may be then sent via the network 110 to the financial organization 180. The financial organization 180 may process the payment request 506 and either perform the payment or deny it. Then, a report 508 may be generated and sent to the WPD device via the network 110. The report may inform user whether the payment succeeded or was denied.

FIG. 6 shows data exchange 600 using the WPD device 200, in accordance to some embodiments. The user may want to obtain information encoded in a barcode presented, for example, on a leaflet 605. In such case, the user may scan the barcode on the leaflet 602 using a camera of the WPD device 200. The scanned barcode may be processed by the processor of the WPD device 200 to retrieve the encoded information, with may include a text, an URL, or other data. If the encoded information contains an URL, the WPD device 200 may communicate with the network 110 to follow the URL. In some embodiments, the user may allow or deny following the URL retrieved from the barcode.

Thus, various devices and methods for facilitating mobile payments using a wearable personal digital device have been described. Although embodiments have been described with reference to specific example embodiments, it will be evident that various modifications and changes may be made to these embodiments without departing from the broader spirit and scope of the system and method described herein. Accordingly, the specification and drawings are to be regarded in an illustrative rather than a restrictive sense.

Various computer implemented methods and systems for messaging, calling, and one-touch payments via a mobile and wearable device are described herein. Expansion of computer networks (Internet) gave rise to a new type of trade—electronic trade, while proliferation of mobile devices (e.g., cell phones/smart phones and other similar devices) that are capable of internet communications take electronic trade even further. A customer can shop online from any location using a mobile device. Therefore, mobile payment services gain increasing importance. However, time-consuming payment process, providing financial details, authorization, and other actions may result in a potential buyer changing his mind with respect to a purchase. Accelerated payment procedure may facilitate electronic purchases and stimulate electronic trade.

Figure 7:
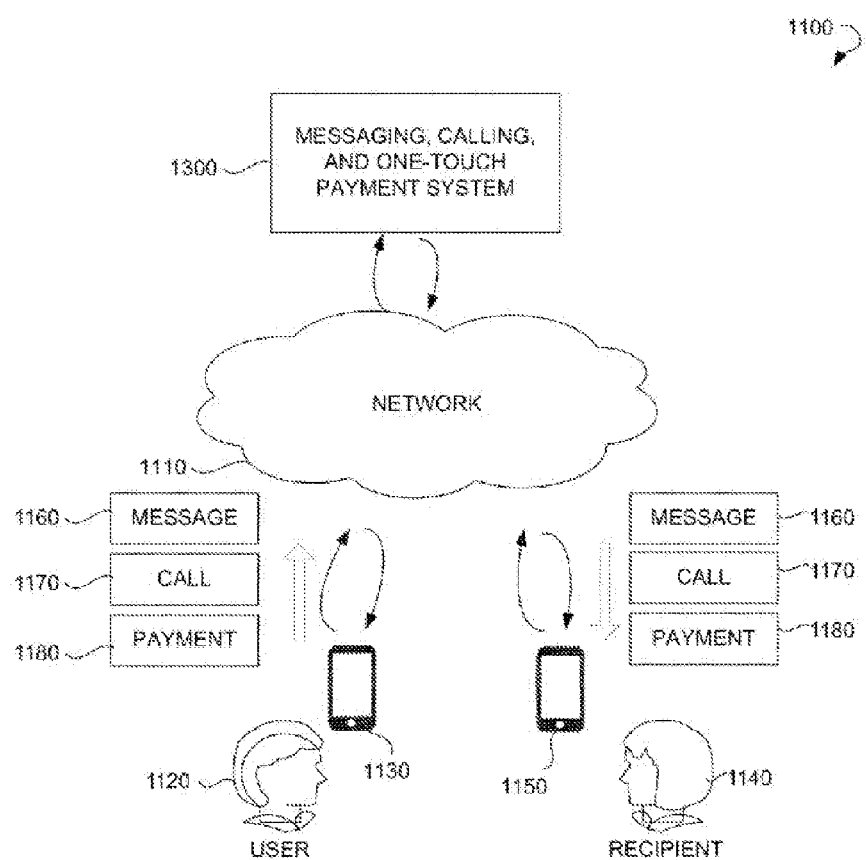
FIG. 7 is a block diagram showing an environment within which a method and system for messaging, calling, and one-touch payments via a mobile and wearable device can be implemented, in accordance with an example embodiment.

Referring now to the drawings, FIG. 7 illustrates an environment 1100 within which systems and methods for messaging, calling, and one-touch payments via a mobile and wearable device can be implemented. The environment 1100 may include a user 1120, a client device 1130, network 1110, a messaging, calling, and one-touch payment system 1300. On a user request, the messaging, calling, and one-touch payment system 1300 may provide an integrated interface on a display of the client device 130. The client device may include a smart phone, a tablet PC, a lap top, an augmented reality glasses, a smart watch, and so forth.

Via the integrated interface, the user 1120 may exchange messages 1160 with a recipient 1140, make calls 1170, and perform one-touch payments 1180.

The messages 1160, calls 1170, and one-touch payments 1180 are transmitted to the system 1300 and further to the recipient 1140 or payee (not shown) via the network 1110 using the client device 1130.

The network 1110 may include the Internet or any other network capable of communicating data between devices. Suitable networks may include or interface with any one or more of, for instance, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular digital packet data), RIM (Research in Motion, Limited) duplex paging network, Bluetooth radio, or an IEEE 802.11-based radio frequency network. The network 1110 can further include or interface with any one or more of an RS-232 serial connection, an IEEE-1394 (Firewire) connection, a Fiber Channel connection, an IrDA (infrared) port, a SCSI (Small Computer Systems Interface) connection, a Universal Serial Bus (USB) connection or other wired or wireless, digital or analog interface or connection, mesh or Digi® networking. The network 1110 may include any suitable number and type of devices (e.g., routers and switches) for forwarding commands, content, and/or web object requests from each client to the online community application and responses back to the clients.

FIG. 2 is a flow chart illustrating a method 1200 for messaging, calling, and one-touch payments via a mobile and wearable device, in accordance with some example embodiments. The method 1200 may be performed by logic that may comprise hardware (e.g., dedicated logic, programmable logic, and microcode), software (such as software run on a general-purpose computer system or a dedicated machine), or a combination of both. In one example embodiment, the processing logic resides at the system 1300 for providing compensation for using a mobile payment service, and the various elements of the system 1300 can perform the method 1200. It will be appreciated by one of ordinary skill that examples of the foregoing modules may be virtual, and instructions said to be executed by a module may, in fact, be retrieved and executed by software. Although various elements may be configured to perform some or all of the various operations described herein, fewer or more elements may be provided and still fall within the scope of various embodiments.

Figure 8:
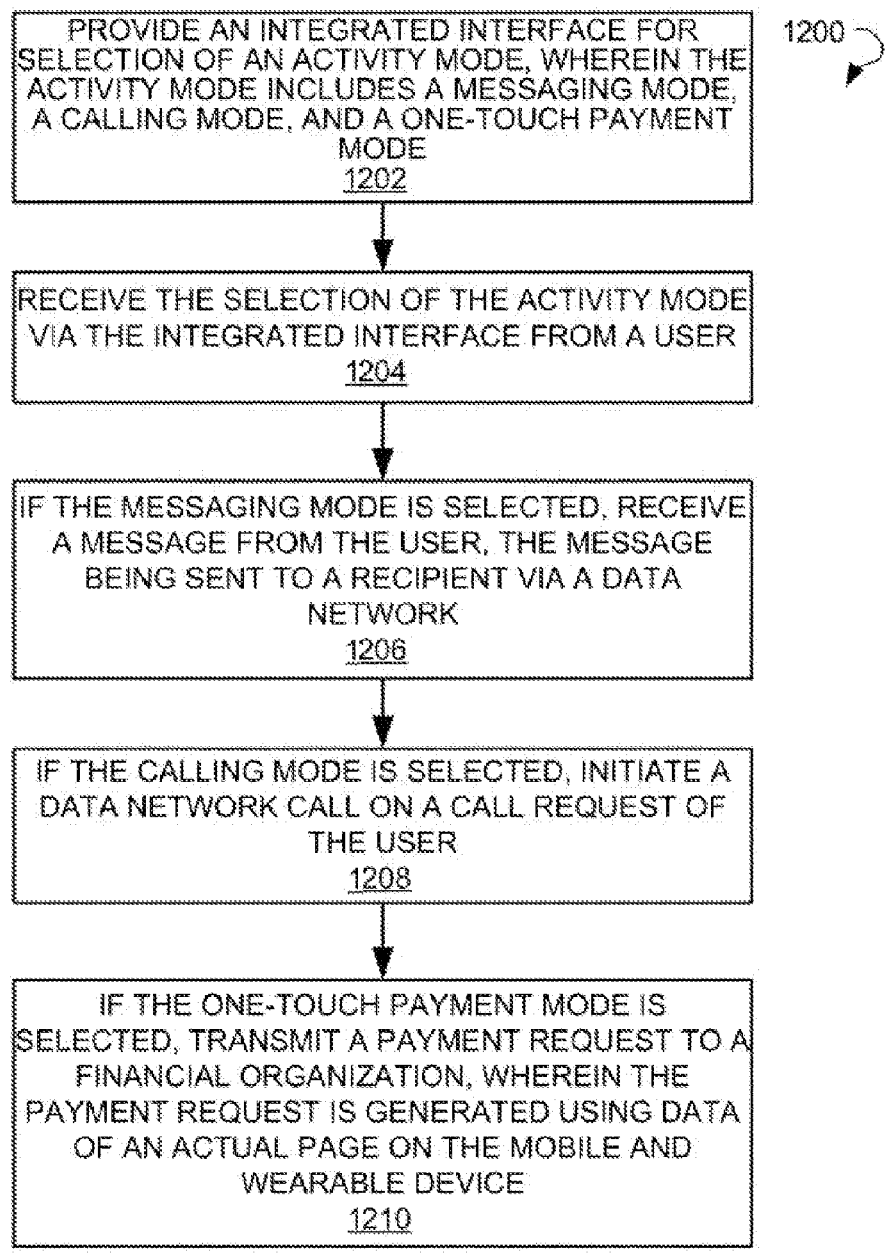
FIG. 8 is a block diagram showing various modules of the messaging, calling, and one-touch payment system, in accordance with certain embodiments.

As shown in FIG. 8, the method 1200 may commence at operation 1202 with providing an integrated interface for selection of an activity mode. The integrated interface may be providing on receiving a request to initiate the integrated interface from the user. To initiate the integrated interface, the user may be prompted to provide a password, a code, a voice command, biometric data, and so forth.

Figure 10:
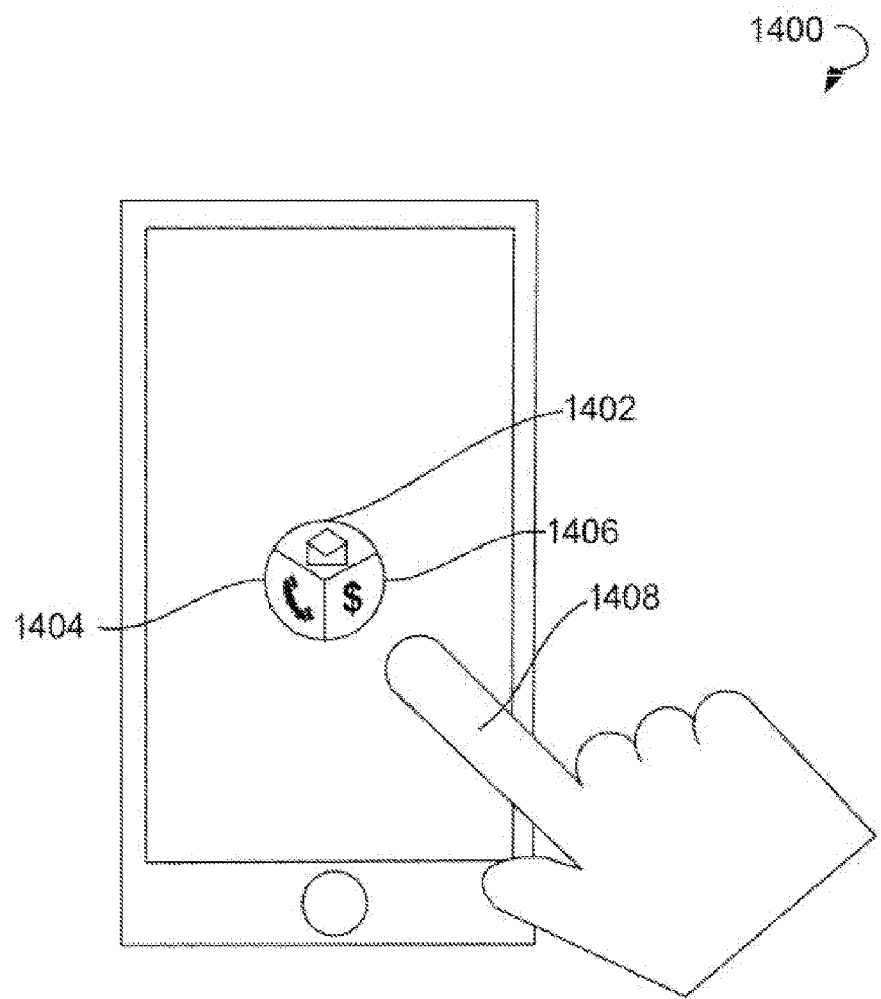
FIG. 10 is a block diagram illustrating an integrated interface, in accordance with certain embodiments.

The activity mode may include a messaging mode, a calling mode, and a one-touch payment mode. The integrated interface may be provided on a user request via a screen of the mobile and wearable device (as illustrated by FIG. 10 which will be described in detail below). The integrated interface may be integrated with at least one mobile application associated with the mobile and wearable device. For example, the integrated interface may be displayed atop other visual output of the mobile and wearable device. When the user desires to send a message, call, or make a payment, the user may select the activity more by touching a specific portion of the integrated interface. Additionally, the selection of the activity mode may include a voice command, a haptic interaction with a touchscreen, a move command, and on forth. The selection of the activity mode may be received via the integrated interface at operation 1204.

The system 1300 may determine the selected activity mode and perform a corresponding action based on the selection. If the messaging mode is selected, the system 1300 may provide to the user a messaging interface on the mobile and wearable device at operation 1206. Through the messaging interface a message may be received from the user and sent to a recipient via a data network. The message may include a text, an audio, a video, and geographical data. Additionally, messages may be received from other users. The integrated interface may notify the user that one or more messages were received. The user may activate the messaging interface to read and/or reply to the messages.

If the calling mode is selected at operation 1204, a calling interface may be provided to the user. The user may select a call recipient in his contacts and make a call request. The system 1300 may receive the call request from the user. Based on the call request, the system 1300 may initiate a data network call at operation 1208. The call may include an audio call, a video call, a holographic video call, and so forth. The call may be performed via a Voice over Internet Protocol (VoIP) service, a free Over-the-Top (OTT) service, and so forth. The free VoIP service and the free OTT service include voice communication, fax, text messaging, voice messaging, video communication, and multimedia transmission. In various embodiments, the free VoIP service and the free OTT service are provided via Wi-Fi, 3G network, 4G network, 5G network, 6G network or upper.

If the one-touch payment mode is selected, a payment request may be transmitted to a financial organization at operation 1210. The financial organization performing the payment may be a bank, a credit company, a virtual currency system, and so forth. The payment request may be generated using data of a mobile application or a page from which the one-touch payment mode is activated. For example, the user may activate the one-touch payment from a purchase page of an online store. The payment may be immediately initiated without requesting further details. Data of a payment recipient and a payment amount may be received from the actual page or application and financial information of the user may be stored in the database of the messaging, calling, and one-touch payment system 1300. The user financial information may be provided by the user during registration with the messaging, calling, and one-touch payment system and may include one or more of the following: bank account information, credit card information, debit card information, gift card information, prepaid card information, insurance account information, merchant account information, mobile currency information, digital money, and so forth. Online payments can be secured by two-factor authorization. One of the factors may be authorization on the integrated interface initiation, and the other factor may include locating the mobile and wearable device associated with the user and comparing the location with the location where the payment is requested.

In an example embodiment, the one-touch payment mode may be used for internet payments. Furthermore, the one-touch payment mode may be integrated with text messaging, hold-to-talk voice messaging, broadcast messaging, sharing of photographs and videos, and location sharing. The one-touch payment mode may be associated with exchanging contacts and payments with users nearby via Bluetooth, providing contacting the users at random one-touch payment. The one-touch payment mode may be associated with social networking services. Additionally, the one-touch payment mode may have a common interface with a proprietary, cross-platform instant messaging subscription service for mobile and wearable devices.

In an example embodiment, the one-touch payment mode may be integrated with a telecommunications application software specializing in providing a video chat, a voice call, and a conference call from mobile and wearable devices. The one-touch payment mode may be compatible with one or more operating systems, wherein the one or more operating systems include Microsoft Windows, Mac, Linux, Android, Blackberry, iOS, and Windows Phone. A one-touch payment service provided using the one-touch payment mode is free. The one-touch payment mode may include a freemium mode, at which a product or service is provided free of charge, but money is charged for proprietary features, functionality, or virtual goods.

In a further example embodiment, the one-touch payment mode may be associated with providing the user with an option to make online purchases and offline purchases using a single touch, in this case, the user uses a predefined address and a predefined payment information, for example, payment information needed to complete the purchase having been entered by the user previously.

The method 1200 may further comprise encrypting, by the processor, the payment request associated with the one-touch payment mode to obtain an encrypted payment request. The encrypted payment request may be decryptable by an ephemeral messaging, one-touch payment, and multimedia application associated with a mobile and wearable device of the recipient. The encrypted payment request may be removed from the mobile and wearable device of the recipient after being read. The method 1200 may further comprise receiving, by the processor, from the user, a registration request to register the user in a mobile payment service. The user may send the registration request via a mobile payment application associated with the mobile and wearable device. The mobile payment application may provide at least a free VoIP service and a free Over-the-Top (OTT) service. The ephemeral messaging, one-touch payment, and multimedia application may be associated with an application protocol, the application protocol being integrated into a communication platform.

In an example embodiment, the mobile and wearable device may comprise a band adapted to secure the mobile and wearable device on a human body. The human body may include a wrist, an arm, a neck, a head, a leg, a waist, an ear, a finger, and any other part of the human body. The band may be adapted to secure the mobile and wearable device under, within or on clothing. The band may include a rechargeable battery configured to power the mobile and wearable device.

In a further example embodiment, the mobile and wearable device may be configured to act as one or more of the following: a mechanical hybrid smart watch, a smart watch, a digital computing glasses, a digital bracelet, a mobile internet device, a mobile web device, a smartphone, a tablet computer, a wearable computer, a calculator watch, a smartwatch, a head-mounted display, a personal digital assistant, a enterprise digital assistant, a calculator, a handheld game console, a portable media player, an ultra-mobile personal computer, a digital still camera, a digital video camera, a mobile phone, a feature phone, a pager, and a personal navigation device.

The mobile and wearable device may further comprise one or more haptic control elements to control operation or functions of the mobile and wearable device. Access to the mobile and wearable device may be controlled by one or more of the following: a password, a Personal Identification Number code, and biometric authorization. The biometric authorization may include fingerprint scanning, palm scanning, face scanning, and retina scanning. The scanning may be performed using the one or more biometric sensors. The one or more biometric sensors may include sensors for sensing a command for the one-touch payment mode, the sensing may be shown on the display. The mobile and wearable device may further comprise a fingerprint reader configured to scan a fingerprint, the scanned fingerprint may be matched to one or more approved fingerprints. The access to the mobile and wearable personal digital may be granted based on the matching.

The mobile and wearable device may further include a camera configured to capture one or more barcodes. The one or more barcodes may include electronic key data, a link to a web-resource, a payment request, and advertising information. One or more barcodes may include a linear dimensional code, a two-dimensional code, a snap tag code, and a QR code, and other machine readable code.

The mobile and wearable device may be associated with an electronic payment card configured to act as one or more of a smart card, a proximity card, an integrated circuit card, a magnetic strip card, and an electronic payment card. The electronic payment card may store card data of one or more debit cards, credit cards, gift cards, loyalty cards, prepaid cards, bank cards, identity cards, and membership cards. The electronic payment card may be configured to attach to the mobile and wearable device.

The mobile and wearable device may be operable to obtain information about a payment system of the user. The mobile and wearable device may be further operable to generate and display a barcode that encodes user payment information. The barcode may be scanned at a checkout counter and processed to retrieve the user payment information from a database of a payment processing system. The user payment information may be used to transfer funds between the user and a merchant.

In a further example embodiment, the method 1200 may further include scanning the code being present on a one-touch QR code invoice. The one-touch QR code invoice may be associated with one or more of an invoice, a credit note, a debit note, a pro forma invoice, and an advance invoice. The one-touch QR code invoice may store one or more of invoice data, monetary amount summary, product data, service data, merchant data, invoice number, and amount to be paid. The one-touch payment information may be stored in the mobile and wearable device associated with the user. The user may activate the one-touch payment mode by holding the mobile and wearable device near a contactless reader and activating a one-touch payment icon on the mobile and wearable device.

Figure 9A:
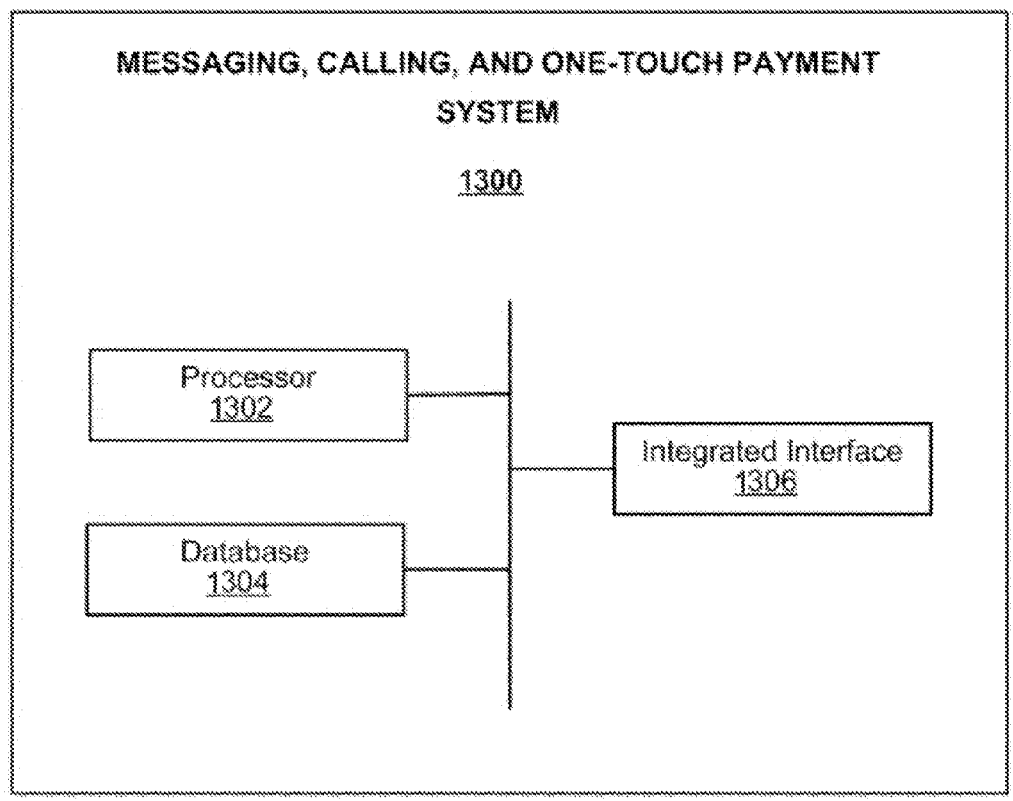
FIGS. 9A and 9B are charts illustrating a method for messaging, calling, and one-touch payments via a mobile and wearable device, in accordance with certain embodiments.
Figure 9B:
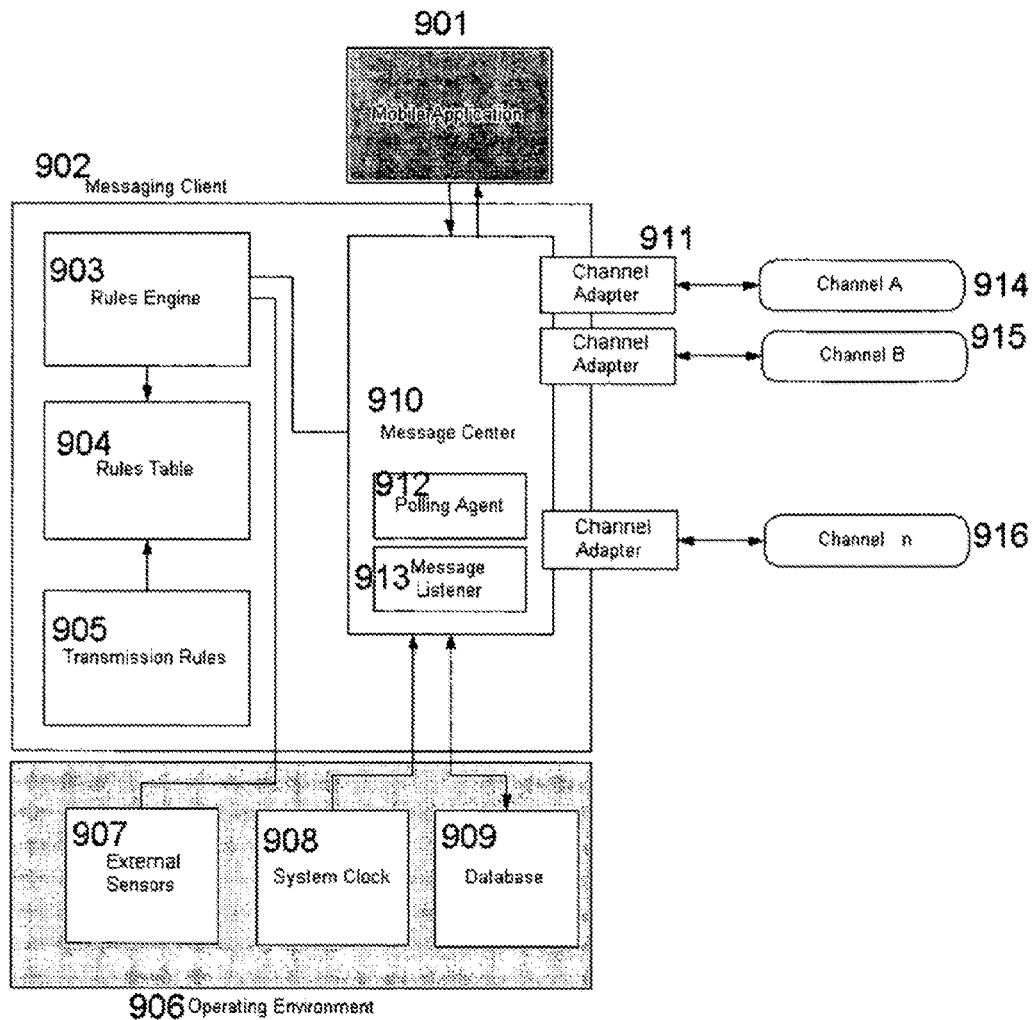

FIG. 9 is a block diagram showing various modules of the system 1300 for messaging, calling, and one-touch payments, in accordance with certain embodiments. The system 1300 may comprise a processor 1302 a database 1304, and an optional integrated interface 1306. The processor 1302 may include a programmable processor, such as a microcontroller, central processing unit (CPU), and so forth. In other embodiments, the processor 1302 may include an application-specific integrated circuit (ASIC) or programmable logic array (PLA), such as a field programmable gate array (FPGA), designed to implement the functions performed by the system 1300. Thus, the processor 1302 may provide an integrated interface for selection of an activity mode. The activity mode may include a messaging mode, a calling mode, and a one-touch payment mode. The processor 1302 may further receive the selection of the activity mode via the integrated interface 1306 from a user. If the messaging mode is selected, the processor 1302 may receive a message from the user and send the message to a recipient via a data network. In an example embodiment, the message may be sent to a controlled list of recipients. The user may set a time limit for the recipient to view the message. After the time limit, the message may be deleted from a mobile and wearable device associated with the recipient.

If the calling mode is selected, the processor 1302 may initiate a data network call on a call request of the user. The data network call may be made via a free VoIP service, a free Over-the-Top (OTT) service, and so forth. If the one-touch payment mode is selected, the processor may transmit a payment request to a financial organization. The payment request may be generated using data of an actual page (in view) on the mobile and wearable device. Additionally, the payment request may include financial data of the user. The financial data of the user may be stored in the database 1304. The payment can be associated with transactional payments based on Unstructured Supplementary Service Data (USSD) or Short Message Service (SMS), direct operator billing, credit card mobile payments, online wallets, QR code payments, contactless near field communication, cloud-based mobile payments, audio signal-based payment, Bluetooth Low Energy (BLE) signal beacon payment, in-application payment, SDK payment, API payment, social networking payment, and direct carrier/bank co-operation.

Contactless near field communication (NFC) may be used to receive data for the payment request. For example, when the one-touch payment mode is selected, the user may make a payment for purchases in physical stores or transportation services. The mobile and wearable device may be equipped with a smart card. When a user waves the mobile and wearable device near a radar module, a payment is made. In some cases, the payment may require authentication. The NFC payment could be deducted from a pre-paid account or changed to a mobile or band account directly. NFC payment may include displaying a barcode on the mobile device screen for mobile payment. The payment barcode can include one or more of the following: a linear barcode, a two-dimensional barcode, a three-dimensional barcode, a machine readable code, and so forth.

The audio channel of the mobile phone may be another wireless interface that is used to receive data for a payment request. Chip, ultra sound and acoustic features of the mobile and wearable device may support mobile payments. Near sound data transfer (NDST), data over voice and NFC produce audio signatures that the mobile phone can pick up to enable electronic transactions.

In some embodiments, a beacon mobile payment sends out a Bluetooth Low Energy (BLE) signal to anyone or any device with mobile application to transfer payment data and get electronic receipt. When a customer checks in, their picture and name may pop up on the retailer's point-of-sale system, when a sales associate at the store totals a bill on a cash register or a card-reading terminal, the beacon mobile payment user gives verbal confirmation to the associate, who matches the customer with the picture on the POS screen and concludes the transaction.

In some embodiments, the system 1300 may be associated with one or more of a transactional payment based on Unstructured Supplementary Service Data, Short Message Service, direct operator billing, a credit card mobile payment, an online wallet, a QR code payment, contactless near field communication payment, a cloud-based mobile payment, an audio signal-based payment, a Bluetooth Low Energy signal beacon payment, an in-application payment, a software development kit (SDK) payment, an application programming interface (API) payment, a social networking payment, and a direct carrier and bank co-operation. wherein the system is compatible with a third party application, wherein the system is associated with one or more of an API and an SDK. Additionally, the system 1300 may be associated with a fingerprint touch recognition payment, a fingerprint press recognition payment, a gesture mark payment, a voice command payment, and a eye blink payment, a fingerprint swipe recognition payment, and a nod payment.

FIG. 10 is a block diagram illustrating an initiated integrated interface 1400 on a screen of the mobile and wearable device, in accordance with certain embodiments. The user initiates the integrated interface 1400. The integrated interface may overlap mobile applications running on the mobile and wearable device. Thus, the user may select an activity mode whenever he desires without additional actions. The activity modes may include a messaging mode 1402, a calling mode 1404, and a one-touch payment mode. The user, for example, by a touch of a hand 1408, may select one of the activity modes. The user selection may be transmitted to the system 1300, and the system may provide the corresponding interface to receive a message or a call request, or extract data from the page in view on the mobile and wearable device to make a payment.

Figure 11:
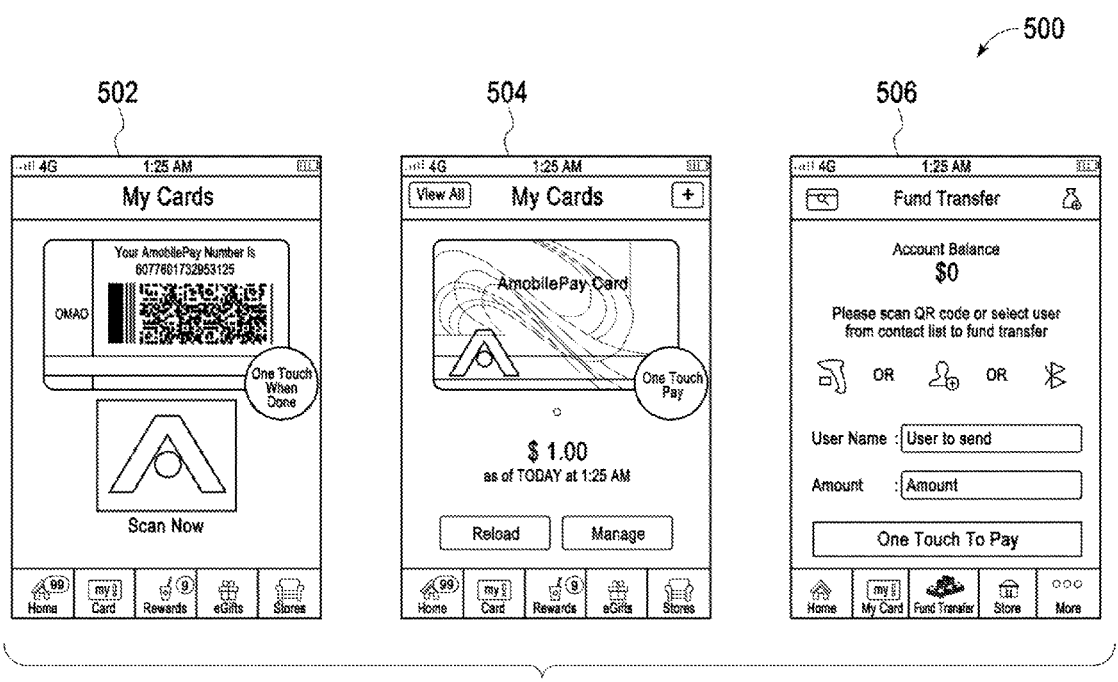
FIG. 11 is a block diagram illustrating example screens of the messaging, calling, and one-touch payment system, in accordance with certain embodiments.

FIG. 11 is a block diagram illustrating example screens 1500 of the messaging, calling, and one-touch payment system, in accordance with certain embodiments. Screen 1502 illustrates providing financial information of the user to the system 1300. The user may capture credit or debit cards, provide details of bank accounts, virtual currency wallets, and so forth. The provided financial data may be stored and/or transmitted to the database in an encoded form as shown by screen 1502. The user may set of the cards or wallets as a default payment account. The default payment account may be used when a one-touch payment is selected. Additionally, user information, such as phone number, an email address, a payment name, and so forth may be stored in the mobile application or an online resource associated with the system 1300.

In some embodiments, the user may select one of the stored payment accounts to perform a payment. Authentication may be made when the user accesses the system 1300. The authentication may include password authentication, voice authentication, biometric authentication, and so forth.

Furthermore, using the system 1300 the user may create automatic payments. For example, as shown on screen 1504, the user may give instructions to transfer 1$ to a specific account every week day at 1:25 PM. The system 1300 may receive the instructions and automatically perform the payment according to the instructions. After a predefined period, for example, after one month, or every week, or every year, the system 1300 may prompt the user either to prolong the automatic payment or to cancel the payment.

Screen 1506 illustrates on-request payments made via the system 1300. The user may select to generate a barcode to be scanned from the screen of the device or sent to a payment recipient. Alternatively, the user may select a further user from his contact list to transfer a certain amount to the selected user. Additionally, money transfer may be performed via Bluetooth.

Figure 12:
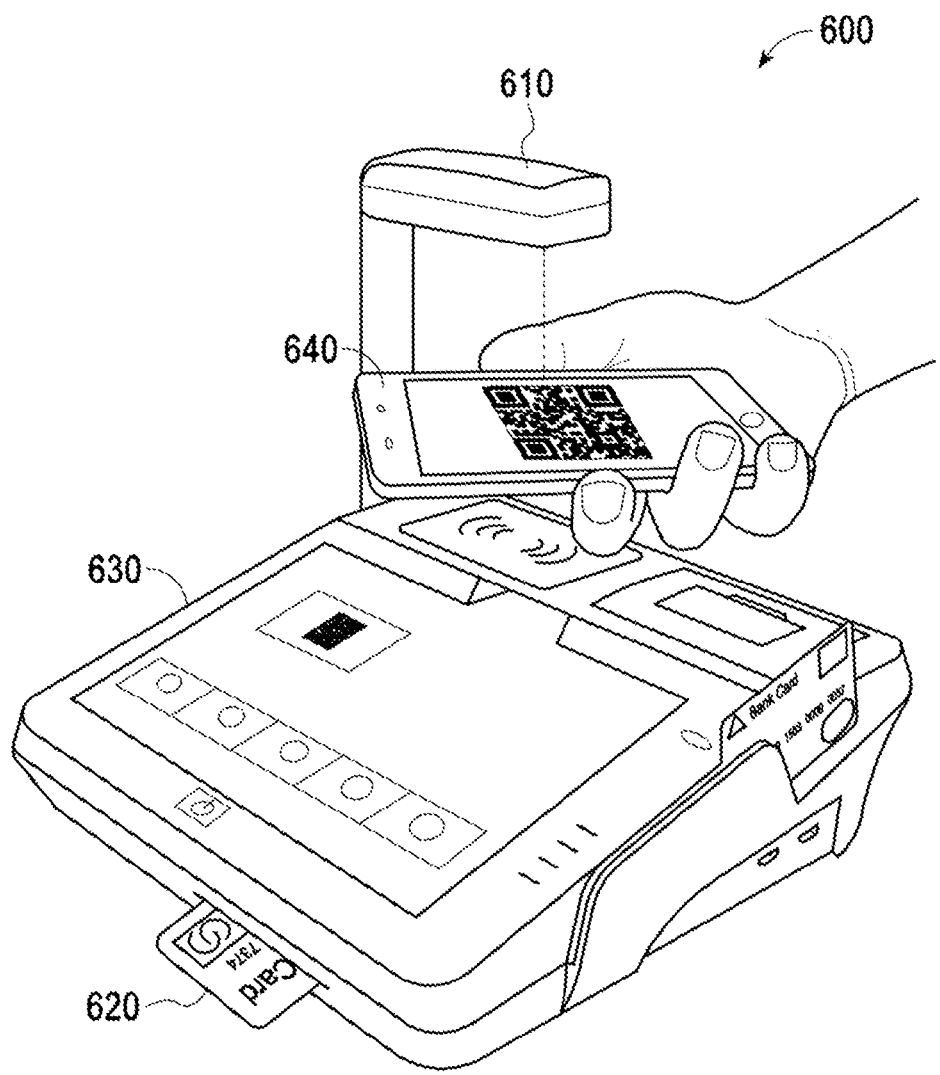
FIG. 12 illustrates scanning barcode from a mobile or wearable device of the user, in accordance with certain embodiments.

FIG. 12 illustrates scanning barcode 1600 from a mobile or wearable device 1640 of the user. The barcode may be scanned by a barcode scanner 1610 of a point of sale terminal 1630. The barcode scanner 1610 may be configured to encrypt data of the scanned barcode or a card 1620 swiped through the point of sale terminal 1630. Additionally the point of sale terminal 1630 may be configured to send messages to one or more social networks.

In some embodiments, access to the barcode scanner, point of sale system, and the mobile and wearable device may be protected by fingerprint scanning.

Figure 13:
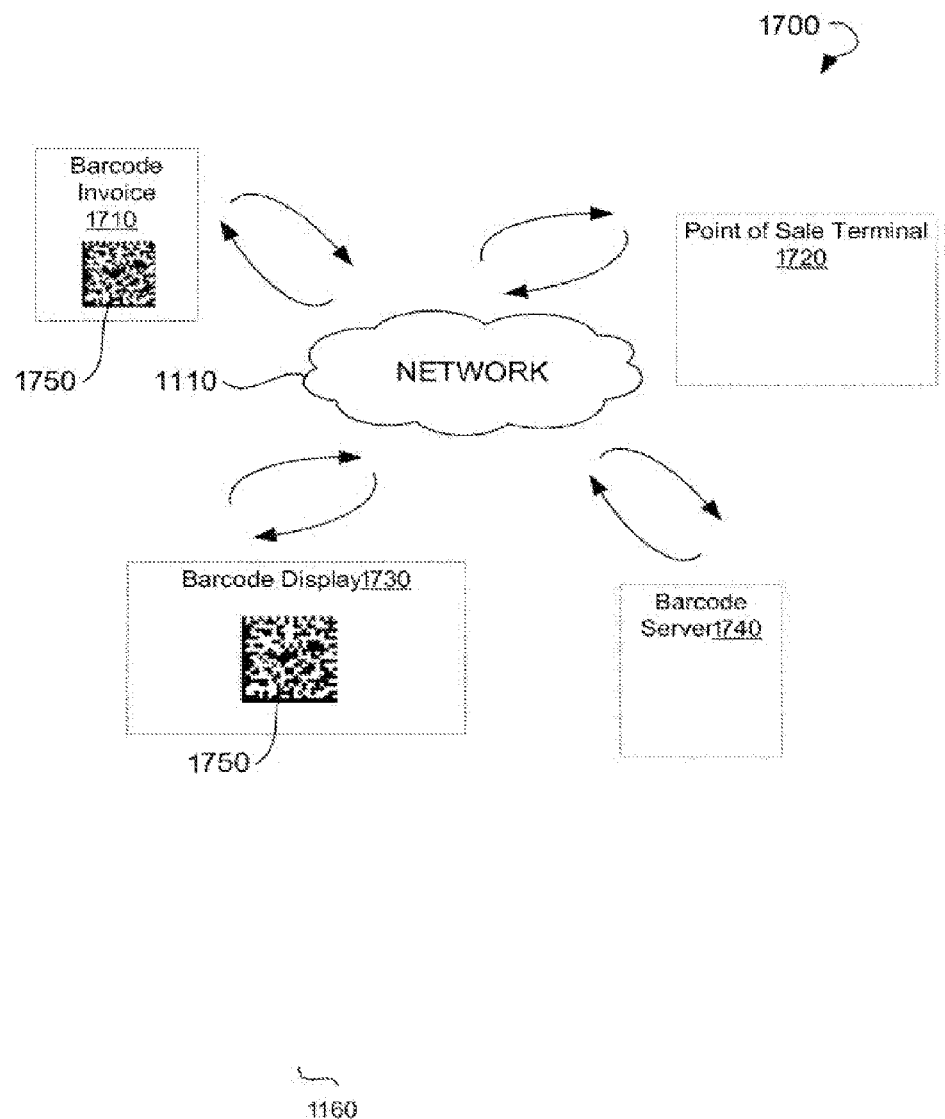
FIG. 13 illustrates using a barcode invoice at a point of sale terminal, in accordance with certain embodiments.

FIG. 13 illustrates using a barcode invoice at a point of sale terminal, in accordance with certain embodiments. FIG. 7 shows a barcode invoice 1710, a barcode display 1730 for displaying a barcode 1750, a point of sale terminal 1720, and a barcode server 1740 communicating to each other via the network 1110. The barcode 1750 may be stored on the barcode server 1740. The barcode invoice 710 may be printed by the point of sale terminal 1720 upon scanning the barcode 750 from a mobile and wearable device (not shown).

Figure 14:
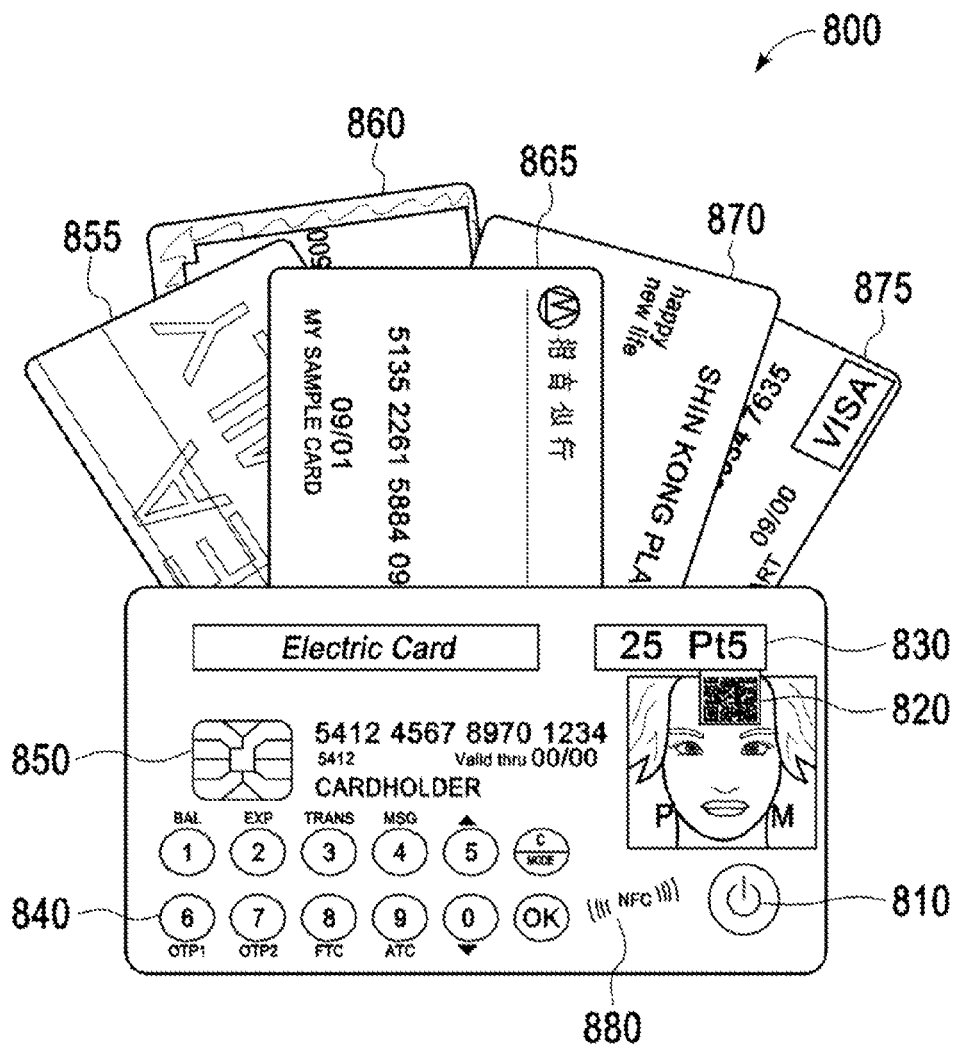
FIG. 14 shows an electronic payment card, in accordance with certain embodiments.

FIG. 14 shows an electronic payment card 1800 that can be used in the messaging, calling, and one-touch payment system. In an example embodiment, the electronic payment card 1800 may include a one-touch payment button 1810, a code 1820, such as a QR-code, a display 1830, a keyboard 1840, a chip 1850, such as an EMV (Europay, MasterCard, and VISA) chip, and an NFC chip 880 for contactless NFC. The electronic payment card 1800 may include data of several payments cards, shown as payment cards 1855, 1860, 1865, 1870, and 1875. The data of the payment cards 1855, 1860, 1865, 1870, and 1875 may be stored on the electronic payment card 1800. Therefore, the user does not need to carry many payment cards during shopping. The user may use the electronic payment card 1800 and select which of the payment cards 1855, 1860, 1865, 1870, and 1875 is to be read at a point of sale terminal in a shop.

Figure 15:
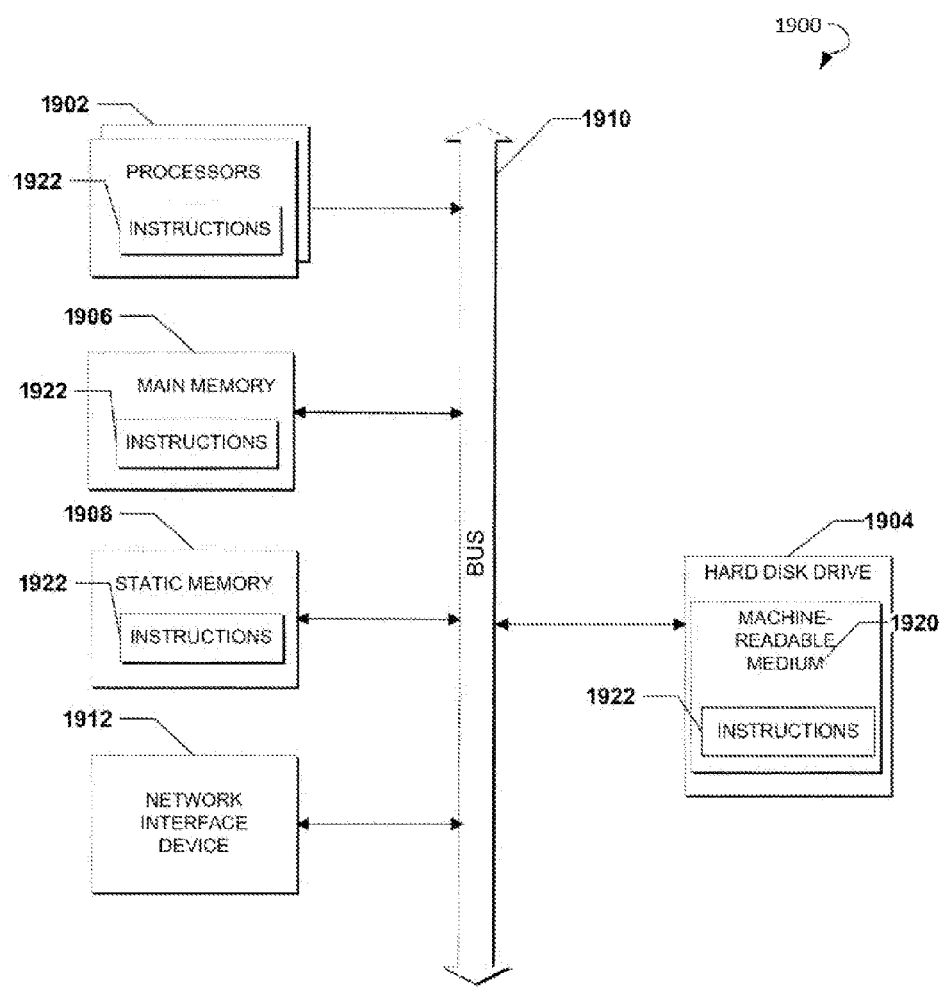
FIG. 15 shows a diagrammatic representation of a computing device for a machine in the exemplary electronic form of a computer system, within which a set of instructions for causing the machine to perform any one or more of the methodologies discussed herein, can be executed.

FIG. 15 shows a diagrammatic representation of a computing device for a machine in the exemplary electronic form of a computer system 900, within which a set of instructions for causing the machine to perform any one or more of the methodologies discussed herein can be executed. In various exemplary embodiments, the machine operates as a standalone device or can be connected (e.g., networked) to other machines. In a networked deployment, the machine can operate in the capacity of a server or a client machine in a server-client network environment, or as a peer machine in a peer-to-peer (or distributed) network environment. The machine can be a personal computer (PC), a tablet PC, a set-top box (STB), a cellular telephone, a digital camera, a portable music player (e.g., a portable hard drive audio device, such as an Moving Picture Experts Group Audio Layer 3 (MP3) player), a web appliance, a network router, a switch, a bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1900 includes a processor or multiple processors 1902, a hard disk drive 1904, a main memory 1906 and a static memory 1908, which communicate with each other via a bus 1910. The computer system 1900 may also include a network interface device 1912. The hard disk drive 1904 may include a computer-readable medium 1920, which stores one or more sets of instructions 1922 embodying or utilized by any one or more of the methodologies or functions described herein. The instructions 1922 can also reside, completely or at least partially, within the main memory 1906 and/or within the processors 1902 during execution thereof by the computer system 1900. The main memory 1906 and the processors 1902 also constitute machine-readable media.

While the computer-readable medium 1920 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media. Such media can also include, without limitation, hard disks, floppy disks, NAND or NOR flash memory, digital video disks, RAM, ROM, and the like.

The exemplary embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software programs for implementing the present method can be written in any number of suitable programming languages such as, for example, C, C++, C# or other compilers, assemblers, interpreters or other computer languages or platforms.

Thus, various systems and methods for messaging, calling, and one-touch payments via a mobile and wearable device have been described. Although embodiments have been described with reference to specific example embodiments, it will be evident that various modifications and changes may be made to these embodiments without departing from the broader spirit and scope of the system and method described herein. Accordingly, the specification and drawings are to be regarded in an illustrative rather than a restrictive sense.

According to the methods and system of the present disclosure, a haptic control is used to select a particular type of multimedia content to be captured. The particular types of multimedia content include image, audio, video, animation, text, and the like. More specifically, when the user wishes to capture the multimedia content, the user starts interaction with a touch display of the smartphone. The user touches the touch display and holds contact of the user finger or stylus for a certain amount of time. A processor of the digital device receives signal about contact of the user with the touch display. The processor considers contact of the user with the touch display as a command to start capturing multimedia content. The processor sends a command to a sensor, such as a camera, of the digital device to capture video. At the same time, the processor starts timer to determine the duration of the touch contact of the user with the touch display.

After the certain amount of time, the user stops touching the touch display. The processor received signal about absence of the touch contact of the user with the touch display. The processor stops the timer. Based on the duration of the touch contact measured by the timer, the processor selects a particular type of multimedia to be stored on the mobile device. All particular types of multimedia content are obtained based on processing the captured video.

The duration of touch contact of the user with the touch display may be preliminary determined for each type of multimedia content. As an example, during touch contact of the user with the touch display, a pictogram describing type of multimedia content corresponding to the current contact time may be shown on the display. The duration of touch contact for each type of multimedia content may be selected by the user or preset by the processor.

In order to ensure privacy of the recorded multimedia content, the multimedia file is encrypted before sending to any intended recipient. Encryption ensures privacy of multimedia content sent to the intended recipient. The multimedia file is encrypted by assigning a unique key to the multimedia file and storing the unique key in an encryption verification unit. The encryption verification unit may be a cloud keystorage. The recipient, upon receiving the encrypted multimedia file, communicates with the encryption verification unit to request access to the encrypted multimedia file. The encryption verification unit verifies whether the recipient is eligible to read the multimedia file. Based on successful verification, the encryption verification unit provides the recipient with an access to the encrypted multimedia file.

A captured multimedia file may be modified before sending. Modification includes applying voice changing features to the captured multimedia file. The user can apply sound effects in real time to an audio input, or modify existing multimedia files. Modification is performed using a cloud-based voice changing unit.

Figure 16:
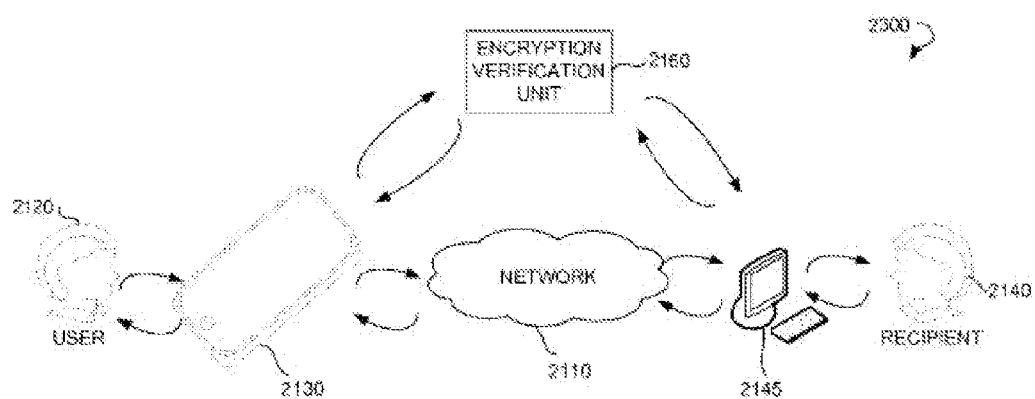
FIG. 16 shows an environment within which a method and a system for multimedia capture and encrypting can be implemented, in accordance with example embodiments.

Referring now to the drawings, FIG. 16 illustrates an environment 2100 within which a method and a system for multimedia capture and encrypting using an ephemeral messaging and multimedia application associated with a digital device can be implemented. The environment 2100 includes a network 2110, a user 2120, a digital device 2130, a recipient 2140, a recipient digital device 2145, a memory 2150, an identity management unit 2185, an encryption verification unit 2160, and a cloud-based voice changing unit 2190. The digital device 2130 and the recipient digital device 2145 include a mobile phone, a lap-top, a personal computer (PC), a tablet PC, a smart phone, a wearable personal digital device, a wearable eyeglass communication device, and so forth.

The network 2110 may include the Internet or any other network capable of communicating data between devices. Suitable networks may include or interface with any one or more of, for instance, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular packet data), RIM (Research in Motion, Limited) duplex paging network, Bluetooth radio, or an IEEE 802.11-based radio frequency network. The network 2110 can further include or interface with any one or more of an RS-232 serial connection, an IEEE-1394 (Firewire) connection, a Fiber Channel connection, an IrDA (infrared) port, a SCSI (Small Computer Systems Interface) connection, a USB (Universal Serial Bus) connection or other wired or wireless, digital or analog interface or connection, mesh or Digi® networking. The network 2110 may include a network of data processing nodes that are interconnected for the purpose of data communication.

The user 2120 includes a person that performs capturing multimedia shown as multimedia capture 2170. The multimedia includes different multimedia types 2180, such as video, audio, animation, image, text, and the like. The captured multimedia may be stored in the memory 2150 or in the digital device 2130. The digital device 2130 modifies the captured multimedia file using the cloud-based voice changing unit 2190.

The user 2120 captures multimedia and sends the captured multimedia to the recipient 2140. The recipient 2140 uses the recipient digital device 2145 to receive and review the multimedia received from the user 2120. In an example embodiment, the user sends multimedia to an e-mail address, a social network account, or the like of the recipient 2140. The digital device 2130 encrypts a multimedia file before sending. The encryption details are sent to the encryption verification unit 2160 and stored in the encryption verification unit 2160. After receiving of the multimedia file by the recipient 2140 and an attempt of the recipient 2140 to view the multimedia file, the encryption verification unit 2160 verifies whether the recipient 2140 is allowed to view the multimedia file. The identity management unit 2185 verifies identity of the user 2120 with existing user accounts.

Figure 17:
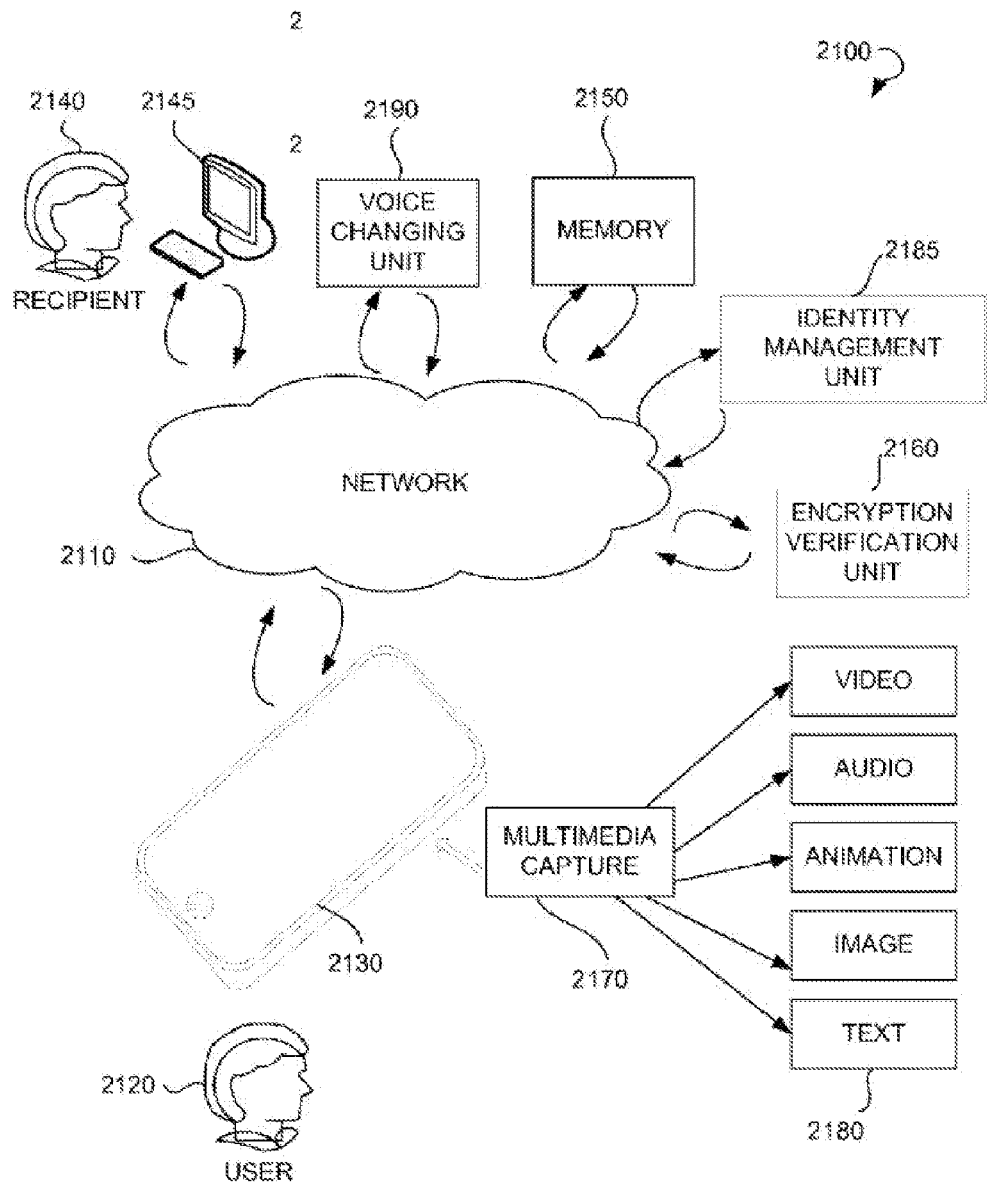
FIG. 17 is a flow chart illustrating a method for multimedia capture and encrypting, in accordance with example embodiments.

FIG. 17 is a flow chart illustrating a method 2200 for multimedia capture and encrypting using an ephemeral messaging and multimedia application associated with a digital device, in accordance with certain embodiments. The ephemeral messaging and multimedia application is associated with an application protocol. The application protocol for ephemeral messaging and multimedia uses standard encryption algorithms implemented for mobile and wearable devices. The application protocol is integrated into a communication platform to create a unified mobile and wearable device platform that is private, encrypted and anonymous.

The method 2200 may start with receiving, by one or more processors, a first user input at operation 2202. In certain embodiments, the first user input includes touch engagement of the user with a display of the digital device. The display may include a touch display. The user can touch the display with a user finger or a stylus. Based on the first user input, a timer is started.

At operation 2204, based on the first user input, one or more sensors are initiated to capture multimedia. As a result, captured multimedia is obtained. In an example embodiment, the captured multimedia includes video.

The method 2200 may continue with receiving, by the one or more processors, a second user input at operation 2206. In an example embodiment, the second user input includes touch release of the user from a display of the digital device. Based on the second user input, the timer is stopped. Furthermore, time between the first user input and the second user input is calculated.

Upon receiving the first user input and the second user input, data associated with the first user input and the second user input is analyzed at operation 2208. The analysis is based on calculated time between the first user input and the second user input.

Based on the analysis, one or more multimedia types are selected for recording from the captured multimedia at operation 2210. an example embodiment, the multimedia type includes text, video, image, audio, animation, and the like. The selection is performed based on predetermined rules. The predetermined rules associate the multimedia type with time between the first user input and the second user input. More specifically, each multimedia type corresponds to a particular predetermined time between the first user input and the second user input.

At operation 2212, the selected one or more multimedia types are recorded to a memory. All types of multimedia are recorded from the captured multimedia, i.e. from the captured video. More specifically, the text is recorded from the captured video based on one or more of text recognition and speech recognition. The image is recorded from the captured video by selecting a frame in the captured video and storing the frame as an image. The audio is recorded from the captured video by storing an audio content of the captured video. The animation is recorded from the captured video by selecting two or more frames in the captured video. The selected frames are cycled to obtain several images shown one after another. After the last image, the first image is shown to obtain a continuous animation.

After recoding the multimedia types to the memory, the recorded multimedia types are modified at operation 2214. Thereby, the one or more modified multimedia types can be obtained. The modification is performed by a cloud-based voice changing unit. The multimedia type is sent to the cloud-based voice changing unit. The cloud-based voice changing unit performs modification of the multimedia type according to user preferences and sends back the modified multimedia type. In an example embodiment, the modifying includes one or more of the following: creating voices for online video games and avatars, voice disguising for anonymity over the radio or internet, changing voices for voiceovers and audio projects, modify user voice based on user preferences, such as make the voice sound like a man, woman, or a child, and so forth. Furthermore, audio effects can be applied to any multimedia files existing on the digital device of the user. In a further example embodiment, the method 2200 optionally comprises applying audio effects to the multimedia during the capture of multimedia, e.g. using a microphone.

In order to prepare the one or more multimedia types for sending, the recorded one or more multimedia types are encrypted at operation 2216. Therefore, one or more encrypted multimedia types are obtained. The one or more encrypted multimedia types are decryptable by an ephemeral messaging and multimedia application associated with a mobile and wearable device of the recipient. The one or more encrypted multimedia types are removed from the mobile and wearable device of the recipient after being read. Therefore, a free and easy way for user to send encrypted multimedia without a trace is provided. Both the user and the recipient have the ephemeral messaging and multimedia application to communicate. Only the recipient is able to decrypt the received multimedia content once the multimedia content was sent. Unique keys for decryption are stored in the ephemeral messaging and multimedia application associated with the user and the ephemeral messaging and multimedia application associated with the recipient. Thus, the ephemeral messaging and multimedia application is an "off-the-record" multimedia and messaging application enabling removing the multimedia content from the digital device of the user after being sent and from the mobile and wearable device of the recipient after being read. Both the user and the recipient are "of-the-record", i.e. are not associated with the multimedia content after the multimedia content is removed from the digital device of the user and the mobile and wearable device of the recipient.

Encryption ensures that an authorized person never has access to the multimedia content of the user. Therefore, the multimedia content is encrypted directly on the digital device of the user before the multimedia content leaves the digital device and then sent to an intended recipient. In an example embodiment, encryption includes assigning a unique key to each of the recorded multimedia types. Optionally, the method 2200 may further comprise sending the unique key to an encryption verification unit. The encryption verification unit may include a key storage. The key storage may include a cloud key storage. In an example embodiment, the key storage includes an open source key storage that provides the user with full control over the storage and protection of the stored unique keys.

Figure 18:
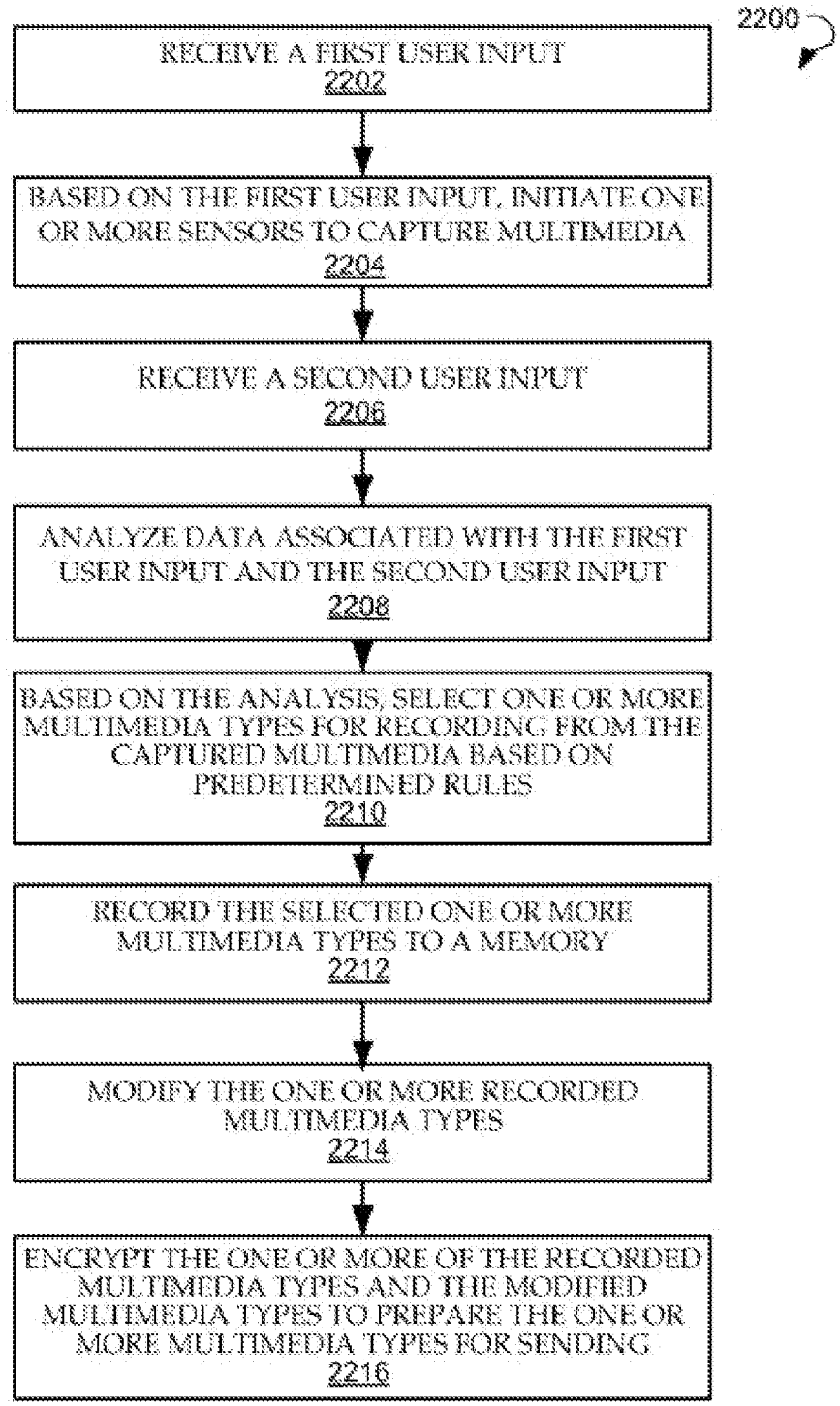
FIG. 18 shows a schematic representation of sending the encrypted multimedia, in accordance with example embodiments.

In a further example embodiment, encryption includes converting files of the recorded one or more multimedia types into Encrypted Trusted Data Format (ETDF) files. The ETDF format is used to wrap and protect the multimedia content and communicate with enabled key storages, which maintain access privileges. FIG. 18 shows a schematic representation 2300 of sending the encrypted multimedia content to an intended recipient. The user 2120 sends an encrypted multimedia file using the digital device 2130. The multimedia content is encrypted and secured inside an ETDF wrapper on the digital device 2130. The unique key is assigned to the multimedia content and sent to the encryption verification unit 2160. The encrypted multimedia content is sent to the recipient digital device 2145 via the network 2110. When the intended recipient 2140 attempts to open the received encrypted multimedia file of the recipient digital device 2145, the ETDF wrapper of the encrypted multimedia file communicates with the key storage, i.e. with to the encryption verification unit 2160, to verify that the intended recipient 2140 is eligible to view the multimedia content. Upon successful verification, the intended recipient 2140 is provided with an access to the encrypted multimedia file.

In further example embodiment, the method for multimedia capture and encrypting comprises receiving from a user a registration request to register the user in a mobile payment service. The user sends the registration request via a mobile payment application associated with the digital device associated with the user. The mobile payment application is operable to provide at least a free Voice over Internet Protocol (VoIP) service, a free Over-the-Top (OTT) service, and so forth. In an example embodiment, the mobile payment application is integrated into the ephemeral messaging and multimedia application.

Figure 19:
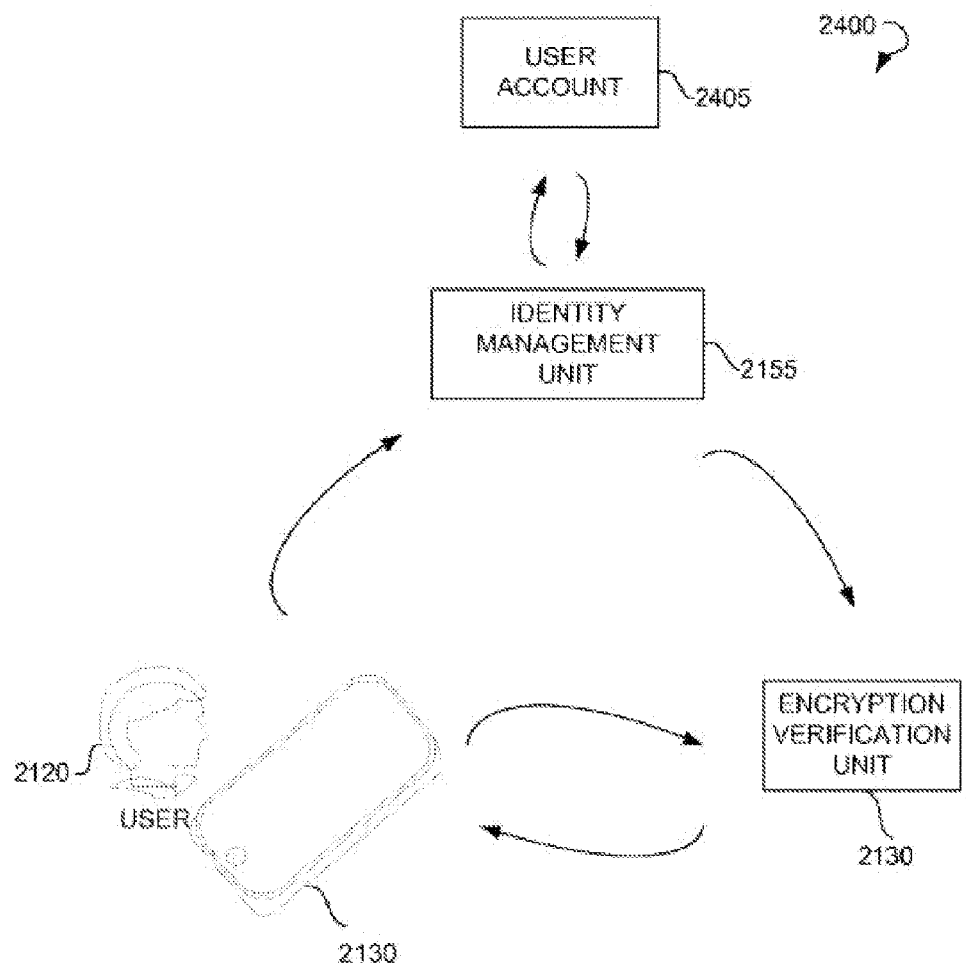
FIG. 19 is a schematic representation of verification of user identity, in accordance with example embodiments.

Optionally, the method for multimedia capture and encrypting further comprises verification of user identity with an existing user account. FIG. 19 is a schematic representation 2400 of verification of user identity. When the user 2120 sends an encrypted multimedia file using the digital device 2130, the digital device 2130 communicates with an identity management unit 2185. The digital device 2130 sends data associated with the user 2120 to the identity management unit 2185. The data associated with the user 2120 is used by the identity management unit 2185 to verify whether the user 2120 has existing user accounts 2405. In an example embodiment, the existing user account 2405 includes one or more of an e-mail account, a social network account, a filesharing account, and the like. In particular, example user accounts 2405 include Gmail account, Yahoo account, Microsoft account, and the like. The data associated with the user 2120 include user name, phone number, a contact card, mobile phone identification number, and the like. The identity management unit 2185 communicates the user identity data to the encryption verification unit 2160. The encryption verification unit 2160 can use the user identity data to allow sending the multimedia content to the existing user account, e.g. sharing the multimedia content in a social network using the existing user account in the social network. Therefore, no new accounts or passwords are needed to send the multimedia content to the existing user account.

Figure 20:
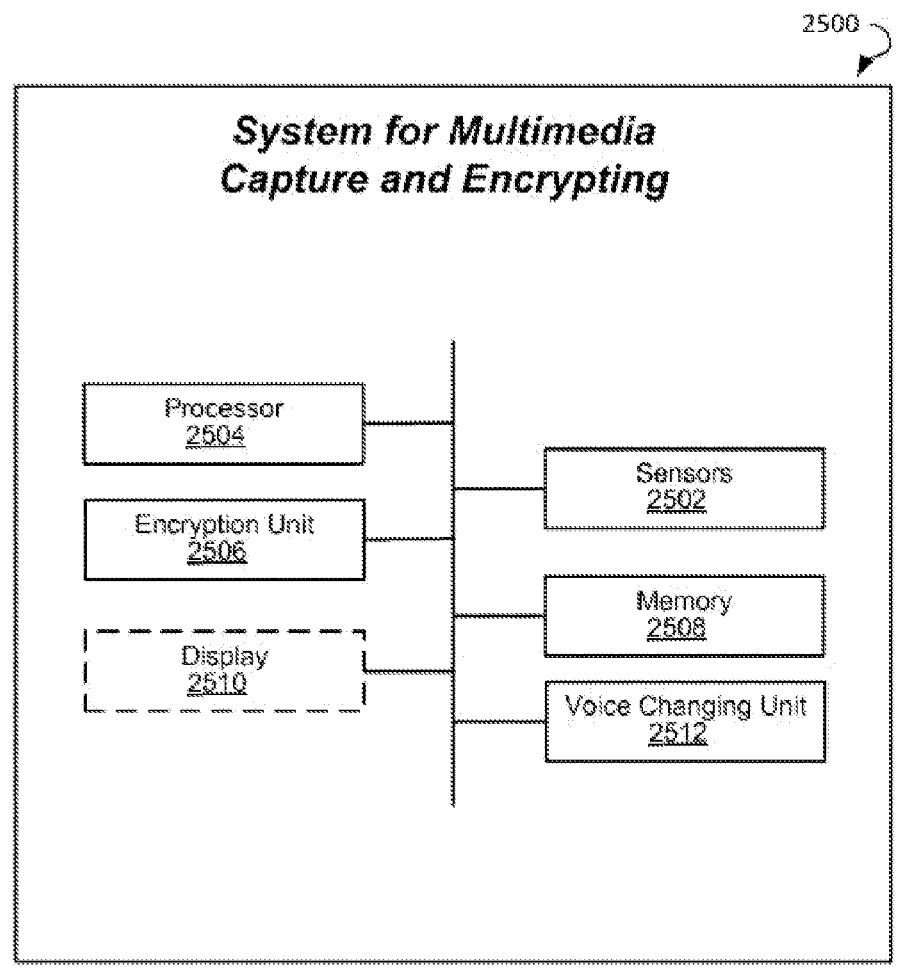
FIG. 20 is a block diagram showing various modules of a system for multimedia capture and encrypting, in accordance with example embodiments.

FIG. 20 is a block diagram showing various modules of a system 2500 for multimedia capture and encrypting using an ephemeral messaging and multimedia application associated with a digital device, in accordance with certain embodiments. Specifically, the system 2500 includes one or more sensors 2502. In an example embodiment, the sensors 2520 include a camera. The sensors 252.0 are operable to capture multimedia to obtain captured multimedia.

The system 2500 further includes one or more processors 2504. The processor 2504 is operable to receive a first user input. In an example embodiment, the first user input includes touch engagement of the user with a display of the digital device. In an example embodiment, the processor 2504 is further operable to start a timer based on the first user input.

Based on the first user input, the processor 2504 is operable to initiate the one or more sensors 2502 to capture multimedia. In an example embodiment, the captured multimedia includes video. The processor 2504 is further operable to receive a second user input. In an example embodiment, the second user input includes touch release of the user from a display of the digital device. In an example embodiment, the processor 2504 is further operable to stop the timer based on the second user input and calculate time between the first user input and the second user input. The processor 2504 analyzes data associated with the first user input and the second user input. The analysis is based on calculated time between the first user input and the second user input. Based on the analysis, the processor 2504 selects one or more multimedia types for recording from the captured multimedia based on predetermined rules. In an example embodiment, the multimedia type includes text, video, image, audio, animation, and the like. The predetermined rules associate the multimedia type with time between the first user input and the second user input.

The processor 2504 records the selected one or more multimedia types to a memory. In example embodiments, the text is recorded from the captured video based on one or more of text recognition and speech recognition. The image is recorded from the captured video by selecting a frame in the captured multimedia. The audio is recorded from the captured video by selecting audio content in the captured video. The animation is recorded from the captured video by selecting two or more frames in the captured video and cycling the selected two or more frames.

In a further example embodiment, the processor 2504 is operable to verify user identity with an existing user account. The existing user account includes one or more of an e-mail account, a social network account, a filesharing account, and so forth.

The system 2500 further includes an encryption unit 2506. The encryption unit 2506 is operable to encrypt the recorded multimedia types to prepare the multimedia types for sending. The encryption includes assigning a unique key to each of the recorded one or more multimedia types. Furthermore, the encryption includes converting the recorded one or more multimedia types into ETDF files. The encryption unit 2506 is further operable to send the unique key to an encryption verification unit. The encryption verification unit includes a key storage, such as a cloud key storage and so forth.

The system 2500 further includes a memory 2508. The memory 2508 is operable to store the one or more multimedia types. The system 500 further optionally includes a display 2510. In an example embodiment, the display 2510 includes a touch display.

The system 2500 further includes a voice changer, also referred to as a voice changing unit 2512. In an example embodiment, the voice changing unit 2512 is cloud-based. The user sends the multimedia type to the cloud-based voice changing unit 2512 using the digital device of the user. Furthermore, the user selects modifications to be applied to the multimedia type by the cloud-based voice changing unit 2512. The cloud-based voice changing unit 2512 performs modification of the multimedia type according to user preferences and sends back the modified multimedia type.

The cloud-based voice changing unit 2512 is operable to modify the one or more recorded multimedia types to obtain one or more modified multimedia types. The cloud-based voice changing unit 2512 is operable to apply audio effects to the multimedia during the capture of multimedia, e.g. using a microphone. Furthermore, the cloud-based voice changing unit 2512 can load and save effect chains for voice modification. The cloud-based voice changing unit 2512 is compatible and can work with existing applications and games on the digital device of the user. The cloud-based voice changing unit 2512 is further operable to output the modified audio file to speakers of the digital device of the user to enable the user hear the effects live. Being accessed using the digital device, the cloud-based voice changing unit 2512 has simple and intuitive interface and causes low CPU usage of the digital device, and, therefore, does not interfere with other running applications on the digital device. The cloud-based voice changing unit 2512 has a plurality of built-in voices and sound effects to make the cloud-based changing unit 2512 convenient to use.

The cloud-based voice changing unit 2512 is optimized for online games in view of ability to morph voice and suppress background voice. Furthermore, the cloud-based voice changing unit 2512 enables calling other users via instant messaging and VoIP. For example, the cloud-based voice changing unit 2512 can apply such affects as car screeches and drum rolls with a push of a key on the digital device. The cloud-based voice changing unit 2512 is operable to create a play list from existing multimedia files on the digital device and broadcast the play list to others users. Many file formats are supported, such as Waveform Audio File format, Ogg format, Windows Media format, MP3 format, and so forth. Files can be paused, stopped, skipped, and the order of the play list changed. The cloud-based voice changing unit 2512 can slow down the recording without changing pitch. Optimized for voice, the cloud-based voice changing unit 2512 is designed for analysis, transcriptions and documentation of dictations and interviews. The high-quality algorithm maintains vocal clarity at variety of speeds. The annotation feature allows the user to bookmark important parts of the recording.

In further example embodiments, the cloud-based voice changing unit 2512 is operable to enable speaking over the Internet and soft-phone using customizable text-to-speech voices with the use of text-to-VoIP plug-in. Such feature is helpful for people who cannot speak with their own voice or who prefers a text alternative to communicating with voice. The cloud-based voice changing unit 2512 is useful for users who want to modify conversation environments while doing voice chats in instant messenger programs, or to make humorous fun voice chats and voice calls with PC-to-phone applications, or to do song remixes. The cloud-based voice changing unit 2512 stands apart from other online or computer-based voice changing programs because of the unlimited ability of the cloud-based voice changing unit 2512 to change and enhance voices and sounds, and the ability to produce high quality audio output.

The cloud-based voice changing unit 2512 is further operable to work in real time while using voice chat. For example, with any click on the preset voice, the user can immediately change the voice. For offline voice changing projects, the user can also hear the morphed voice instantly so that the user saves a lot of time to get the desired voice output.

The cloud-based voice changing unit 2512 modifies the recorded multimedia types by performing one or more of the following: correct pitch of a vocal track, align vocal tracks together to make the vocal tracks tight and effective, fix the rhythm of a particular vocal line, give a "robotic" effect to the vocal track, transpose the vocal track, add backup vocals effect to the vocal track, reverse the effects of poor pitch correction if the correction is too evident, remove noisy plosives, soften harsh "s" sounds with exaggerated sibilance, clean the vocal track from noise on the backup, and so forth. Typically, a voice changer can increase or decrease voice pitch by one or two octaves without creating the "digital" sounding voice.

The cloud-based voice changing unit 2512 may use an audio driver that should be used for recording the modified sound. That audio driver should also be used when conFIGuring an application that the user wants to use. For example, the user can set "fake voice" mode of the cloud-based voice changing unit 2512 as a default mode.

In further example embodiment, effects that can be applied to the voice include modifying the voice by modifying several parameters like pitch, format, noise threshold, and so on. Next, the 'robotic effect' may be used to modify the voice, making it seem like a robot voice. The next effect is the echo, duration and the strength of which can be configured by the user. Furthermore, the cloud-based voice changing unit 2512 changes the pitch-sensitive fundamental waves of voice on the recorded multimedia file. Pitch is only one of the elements of the voice, therefore, there is a limitation as to how much change can be made to avoid a digital sounding voice. To apply the effects, the cloud-based voice changing unit 2512 can use electronic circuits to change or buffer the unnatural sounds.

In a further example embodiment, the cloud-based voice changing unit 2512 is used to alter voice of a user to either make voice sound like voice of somebody else or to disguise voice of user. Thus, the cloud-based voice changing unit 2512 changes tone or pitch, add distortion to voice of the user, and a combination of all of the above.

Figure 21:
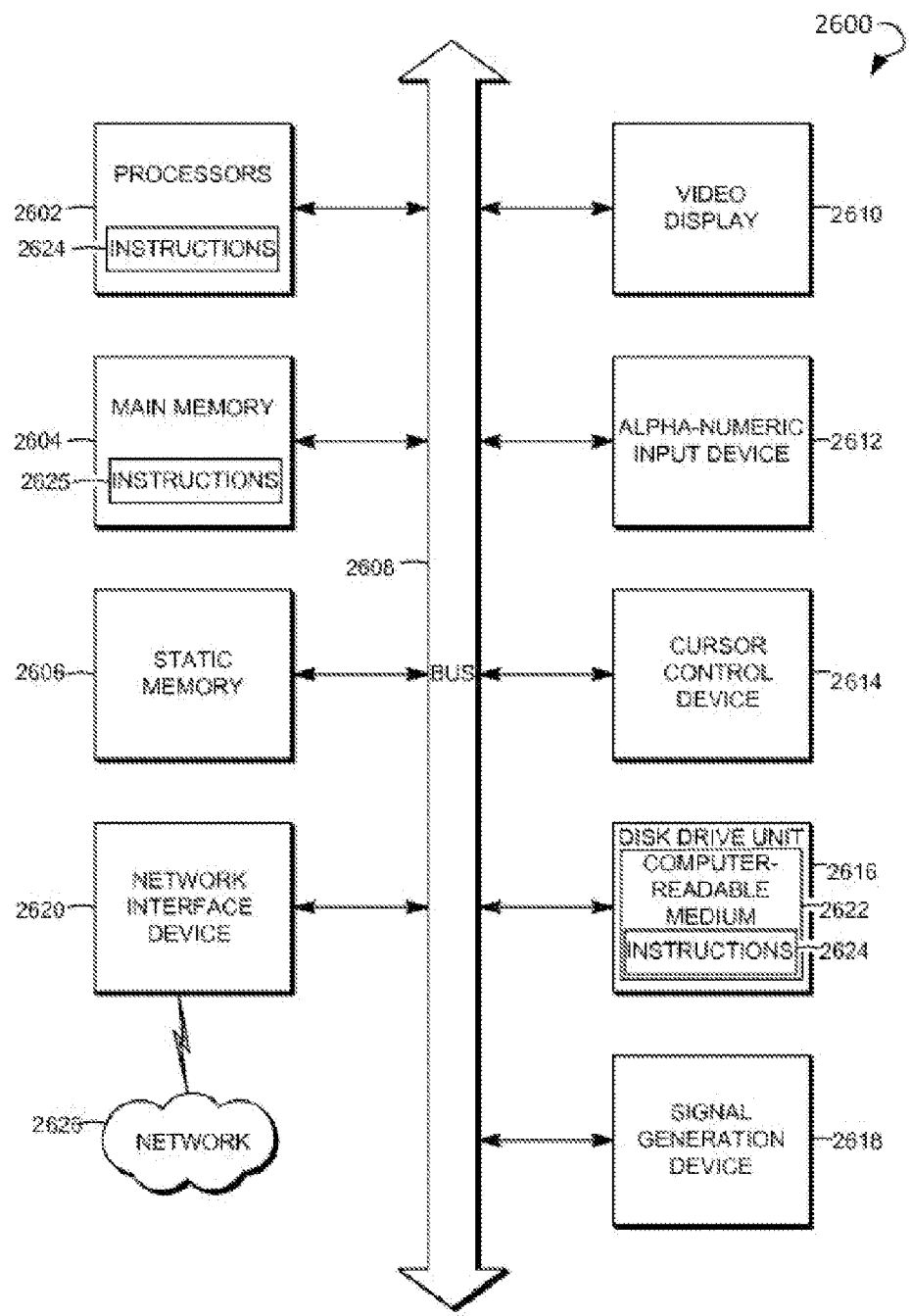
FIG. 21 is a schematic diagram illustrating an example of a computer system for performing any one or more of the methods discussed herein.

FIG. 21 shows a diagrammatic representation of a machine in the example electronic form of a computer system 2600, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 2600 includes a processor or multiple processors 2602 (e.g., a central processing unit (CPU), a graphics processing unit (GPU), or both), a main memory 2604 and a static memory 2606, which communicate with each other via a bus 2608. The computer system 2600 may further include a video display unit 2610 (e.g., a liquid crystal display (LCD) or a cathode ray tube (CRT)). The computer system 2600 may also include an alphanumeric input device 2612 (e.g., a keyboard), a cursor control device 2614 (e.g., a mouse), a disk drive unit 2616, a signal generation device 2618 (e.g., a speaker) and a network interface device 2620.

The disk drive unit 2616 includes a non-transitory computer-readable medium 2622, on which is stored one or more sets of instructions and data structures (e.g., instructions 2624) embodying or utilized by any one or more of the methodologies or functions described herein. The instructions 2624 may also reside, completely or at least partially, within the main memory 2604 and/or within the processors 2602 during execution thereof by the computer system 2600. The main memory 2604 and the processors 2602 may also constitute machine-readable media.

The instructions 2624 may further be transmitted or received over a network 2626 via the network interface device 2620 utilizing any one of a number of well-known transfer protocols (e.g., Hyper Text Transfer Protocol (HTTP)).

While the computer-readable medium 2622 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAMs), read only memory (ROMs), and the like.

The example embodiments described herein may be implemented in an operating environment comprising software installed on a computer, in hardware, or in a combination of software and hardware.

Thus, various systems and methods for multimedia capture and encrypting have been described. Although embodiments have been described with reference to specific example embodiments, it will be evident that various modifications and changes may be made to these embodiments without departing from the broader spirit and scope of the system and method described herein. Accordingly, the specification and drawings are to be regarded in an illustrative rather than a restrictive sense.

What is claimed is:

1. A method for multimedia capture and encrypting using an ephemeral messaging and multimedia application associated with a mobile and wearable digital device, the method comprising: selecting as a first user input a haptic control for a particular type of multimedia content to be captured; interacting as a second user input with a touch display of the digital device by touching a touch display and holding a touch contact of a user finger or stylus for a predetermined time, wherein the touching comprises a first user input and a release after the predetermined time comprises a second user input; analyzing data associated with the first user input and the second user input, the analyzing including calculating time between the first user input and the second user input; based on the analysis, selecting one or more multimedia types for recording from the captured multimedia based on predetermined rules associated with the predetermined time; sending a command to a sensor of the digital device to capture video to memory of the selected multimedia type based on the predetermined rules; modify the one or more recorded multimedia types, by a cloud-based voice changing unit, to obtain one or more modified multimedia types; encrypting, via an encryption unit one or more of the recorded multimedia types and the modified multimedia types to prepare the one or more multimedia types for sending; and storing the one or more multimedia types in a memory operable, wherein the cloud-based voice changing unit is coupled to a payment processor coupled; providing an integrated interface for selection of an activity mode, wherein the activity mode includes a messaging mode, a calling mode, and a one-touch payment mode; receiving the selection of the activity mode via the integrated interface from a user; if the messaging mode is selected, receiving a message from the user, the message being sent to a recipient via a data network; and if the calling mode is selected, initiating a data network call on a call request of the user; and if the one-touch payment mode is selected, transmitting a payment request to a financial organization, wherein the payment request is generated using data of an actual page on the mobile and wearable device; and encrypting the payment request associated with the one-touch payment mode to obtain an encrypted payment request, wherein the encrypted payment request is decryptable by an ephemeral messaging, one-touch payment, and multimedia application of a mobile and wearable device of the recipient, wherein the encrypted payment request is removed from the mobile and wearable device of the recipient after the encrypted payment request is optically read; wherein the ephemeral messaging, one-touch payment, and multimedia application is associated with an application protocol, the application protocol being integrated into a communication platform; and receiving, from the user, a registration request to register the user in a mobile payment service, wherein the user sends the registration request via a mobile payment application associated with the mobile and wearable device, the mobile payment application providing at least a free VoIP service and a free Over-the-Top (OTT) service; securing the mobile and wearable device comprises via a band to a part of a human body, the part of the human body including a wrist, an arm, a neck, a bead, a leg., a waist, an ear, and a finger, securing, via the band, the mobile and wearable device under, within or on clothing, including a within the band, a rechargeable battery configured to power the mobile and wearable device; operably connecting a database to the digital device; and wherein database stores financial information of the user providing during user registration with the system; wherein the receiving of the selection of the activity mode includes a voice command, a haptic interaction with a touchscreen of the mobile and wearable device, and a move command, wherein the mobile and wearable device comprises one or more haptic control elements to control operation or functions of the mobile and wearable device, and controlling access to the mobile and wearable device by one or more of the following: a password, a Personal Identification Number code, and biometric authorization, the biometric authorization including fingerprint scanning, palm scanning, face scanning, and retina scanning, wherein the scanning is performed using the one or more biometric sensors, wherein the one or more biometric sensors include sensors for sensing a command for the one-touch payment mode, the sensing shown on the display, the mobile and wearable device further comprising a fingerprint reader configured to scan a fingerprint, the scanned fingerprint being matched to one or more approved fingerprints, wherein access to the mobile and wearable personal digital is granted based on the matching; wherein the mobile and wearable device further comprises a camera configured to capture one or more codes, the one or more codes including electronic key data, a link to a web-resource, a payment request, and advertising information, wherein the one or more codes include barcode, a linear dimensional code, a two-dimensional code, a snap tag code, and a QR code; wherein the mobile and wearable device obtains information about a payment system of the user, wherein the mobile and wearable device generates and displays a barcode that encodes user payment information, scanning and processing the barcode at a checkout counter to retrieve the user payment information from a database of a payment processing system, the user payment information being used to transfer funds between the user and the recipient, wherein the recipient is a merchant; associating the mobile and wearable device is associated with an electronic payment card configured to act as one or more of a smart card, a proximity card, an integrated circuit card, a magnetic strip card, and an electronic payment card, the electronic payment card storing card data of one or more debit cards, credit cards, gift cards, loyalty cards, prepaid cards, bank cards, identity cards, and membership cards, wherein the electronic payment card is configured to attach to the mobile and wearable device; wherein the method further comprises scanning the code, the code being present on a one-touch QR code invoice, the one-touch QR code invoice storing one or more of invoice data, monetary amount summary, product data, service data, merchant data, invoice number, and amount to be paid, the one-touch QR code invoice being associated with one or more of an invoice, a credit note, a debit note, a pro forma invoice, and an advance invoice; and storing one-touch payment information in the mobile card wearable device associated with the user, wherein the user activates the one-touch payment mode by holding the mobile and wearable device near a contactless reader card activating a one-touch payment icon on the mobile and wearable device and makes a secure payment, authorized in part when the location of the payment matches with a determined location of the device.

2. The method of claim 1, wherein the first user input includes touch engagement of the user with a display of the digital device; and wherein the second user input includes touch release of the user from a display of the digital device.

3. The method of claim 1, further comprising:
based on the first user input, starting the timer; and
based on the second user input, stopping the timer; and
calculating time between the first user input and the second user input.

4. The method of claim 3, comprising analyzing is based on the time between the first user input and the second user input.

5. The method of claim 1, wherein the multimedia type includes text, video, image, audio, and animation.

6. The method of claim 1, wherein the predetermined rules associate the multimedia type with time between the first user input and the second user input.

7. The method of claim 1, wherein the captured multimedia includes video.

8. The method of claim 7, wherein the text is recorded from the captured multimedia based on one or more of text recognition and speech recognition.

9. The method of claim 7, wherein the image is recorded from the captured multimedia by selecting a frame in the captured multimedia.

10. The method of claim 7, wherein the audio is recorded from the captured multimedia by selecting audio content in the captured multimedia.

11. The method of claim 7, wherein the animation is recorded from the captured multimedia by selecting two or more frames in the captured multimedia and cycling the selected two or more frames.

12. The method of claim 1, comprising encrypting data by assigning a unique key to each of the recorded multimedia types and the modified multimedia types.

13. The method of claim 12, further comprising sending the unique key to an encryption verification unit, wherein the encryption verification unit includes a key storage.

14. The method of claim 12, wherein the encrypting includes converting the recorded multimedia types and the modified multimedia types into Encrypted Trusted Data Format (ETDF) files.

15. The method of claim 1, further comprising verifying user identity with an existing user account, wherein the existing user account includes one or more of an e-mail account, a social network account, and a filesharing account.

16. The method of claim 1, comprising:
receiving, by one or more processors, the first user input for initiating one or more sensors to capture multimedia to obtain captured multimedia;
receiving, by the one or more processors, the second user input;
analyzing, by the one or more processors, data associated with the first user input and the second user input;
based on the analysis, selecting, by the one or more processors, one or more multimedia types for recording from the captured multimedia based on predetermined rules;
recording, by the one or more processors, the selected one or more multimedia types to a memory to obtain one or more recorded multimedia types;
modifying, by a cloud-based voice changing unit, the one or more recorded multimedia types to obtain one or more modified multimedia types;
encrypting, by an encryption unit, one or more of the recorded more multimedia types and the modified multimedia types to obtain one or more encrypted multimedia types, wherein the one or more encrypted multimedia types are decryptable by an ephemeral messaging and multimedia application associated with a mobile and wearable device of a recipient, the one or more encrypted multimedia types being removed from the mobile and wearable device of the recipient after being read; and
receiving, by the one or more processors, from a user, a registration request to register the user in a mobile payment service, wherein the user sends the registration request via a mobile payment application associated with the digital device associated with the user, the mobile payment application providing at least a free Voice over Internet Protocol (VoIP) service and a free Over-the-Top (OTT) service;
wherein the ephemeral messaging and multimedia application is associated with an application protocol, the application protocol being integrated into a communication platform.

17. The method of claim 1, wherein the modifying includes one or more of the following: creating voices for online video games and avatars, voice disguising for anonymity over the radio or internet, changing voices for voiceovers and audio projects, modify user voice based on user preferences.

18. The method of claim 1, further comprising applying audio effects to the multimedia during the capture of multimedia.

19. The method of claim 1, comprising requesting payment with a payment recipient, a payment amount, and user financial information associated with the user, wherein the payment recipient and the payment amount are received from the at least one mobile application, and the user financial information is stored on the mobile and wearable device.

20. A system for multimedia capture and encrypting using an ephemeral messaging and multimedia application associated with a mobile and wearable digital device, the system comprising: one or more sensors operable to capture multimedia to obtain captured multimedia; one or more processors operable to: receive a first user input; initiate, based on the first user input, the one or more sensors to capture multimedia; based on the first user input, start a timer; receive a second user input; based on the second user input, stop the timer; analyze data associated with the first user input and the second user input, the analyzing including calculating time between the first user input and the second user input, wherein the first user input is a user touch of the device and the second user input is a user release of the device after the first user input; based on the analysis, select one or more multimedia types for recording from the captured multimedia based on predetermined rules; and record the selected one or more multimedia types to a memory to obtain one or more recorded multimedia types; and a cloud-based voice changing unit operable to: modify the one or more recorded multimedia types to obtain one or more modified multimedia types; an encryption unit operable to: encrypt one or more of the recorded multimedia types and the modified multimedia types to prepare the one or more multimedia types for sending; and a memory operable to store the one or more multimedia types; and a payment processor coupled to the cloud-based voice changing unit; the one or more processors configured to: provide an integrated interface for selection of an activity mode, wherein the activity mode includes a messaging mode, a calling mode, and a one-touch payment mode; receive the selection of the activity mode via the integrated interface from a user; if the messaging mode is selected, receive a message from the user, the message being sent to a recipient via a data network; and if the calling mode is selected, initiate a data network call on a call request of the user; and if the one-touch payment mode is selected, transmit a payment request to a financial organization, wherein the payment request is generated using data of an actual page on the mobile and wearable device; and encrypt the payment request associated with the one-touch payment mode to obtain an encrypted payment request, wherein the encrypted payment request is decryptable by an ephemeral messaging, one-touch payment, and multimedia application of a mobile and wearable device of the recipient, wherein the encrypted payment request is removed from the mobile and wearable device of the recipient after the encrypted payment request is optically read; wherein the ephemeral messaging, one-touch payment, and multimedia application is associated with an application protocol, the application protocol being integrated into a communication platform; and receive, from the user, a registration request to register the user in a mobile payment service, wherein the user sends the registration request via a mobile payment application associated with the mobile and wearable device, the mobile payment application providing at least a free VoIP service and a free Over-the-Top (OTT) service; wherein the mobile and wearable device comprises a band adapted to secure the mobile and wearable device on a human body, the human body including a wrist, an arm, a neck, a bead, a leg., a waist, an ear, and a finger, wherein the band is adapted to secure the mobile and wearable device under, within or on clothing, wherein the band includes a rechargeable battery configured to power the mobile and wearable device; and wherein the system further comprises a database in communication with the processor, the database storing user financial information provided by the user during registration with the application; wherein the receiving of the selection of the activity mode includes a voice command, a haptic interaction with a touchscreen of the mobile and wearable device, and a move command, wherein the mobile and wearable device comprises one or more haptic control elements to control operation or functions of the mobile and wearable device, and wherein access to the mobile and wearable device is controlled by one or more of the following: a password, a Personal Identification Number code, and biometric authorization, the biometric authorization including fingerprint scanning, palm scanning, face scanning, and retina scanning, wherein the scanning is performed using the one or more biometric sensors, wherein the one or more biometric sensors include sensors for sensing a command for the one-touch payment mode, the sensing shown on the display, the mobile and wearable device further comprising a fingerprint reader configured to scan a fingerprint, the scanned fingerprint being matched to one or more approved fingerprints, wherein access to the mobile and wearable personal digital is granted based on the matching; wherein the mobile and wearable device further comprises a camera configured to capture one or more codes, the one or more codes including electronic key data, a link to a web-resource, a payment request, and advertising information, wherein the one or more codes include barcode, a linear dimensional code, a two-dimensional code, a snap tag code, and a QR code; wherein the mobile and wearable device is operable to obtain information about a payment system of the user, wherein the mobile and wearable device is operable to generate and display a barcode that encodes user payment information, the barcode being scanned at a checkout counter and processed to retrieve the user payment information from a database of a payment processing system, the user payment information being used to transfer funds between the user and the recipient, wherein the recipient is a merchant; wherein the mobile and wearable device is associated with an electronic payment card configured to act as one or more of a smart card, a proximity card, an integrated circuit card, a magnetic strip card, and an electronic payment card, the electronic payment card storing card data of one or more debit cards, credit cards, gift cards, loyalty cards, prepaid cards, bank cards, identity cards, and membership cards, wherein the electronic payment card is configured to attach to the mobile and wearable device: wherein the system further comprises scanning the code, the code being present on a one-touch QR code invoice, the one-touch QR code invoice storing one or more of invoice data, monetary amount summary, product data, service data, merchant data, invoice number, and amount to be paid, the one-touch QR code invoice being associated with one or more of an invoice, a credit note, a debit note, a pro forma invoice, and an advance invoice; and wherein one-touch payment information is stored in the mobile card wearable device associated with the user, wherein the user activates the one-touch payment mode by holding the mobile and wearable device near a contactless reader card activating a one-touch payment icon on the mobile and wearable device and makes a secure payment, authorized in part when the location of the payment matches with a determined location of the device.

21. The method of claim 20, wherein the user financial information includes one or more of the following: bank account information, credit card information, debit card information, gift card information, prepaid card information, insurance account information, merchant account information, mobile currency information, and digital money.

22. The method of claim 20, wherein the one-touch payment mode is used for internet payments, wherein the one-touch payment mode is integrated with one or more of text messaging, hold-to-talk voice messaging, broadcast messaging, sharing of photographs and videos, and location sharing, wherein the one-touch payment mode is associated with exchanging contacts and payments with users nearby via Bluetooth, providing contacting the users at random one-touch payments, and wherein the one-touch payment mode is associated with social networking services, wherein the one-touch payment mode has a common interface with a proprietary, cross-platform instant messaging subscription service for mobile and wearable devices; wherein the one-touch payment mode is integrated with a telecommunications application software, the telecommunications application software specializing in providing a video chat, a voice call, and a conference call from mobile and wearable devices; wherein the one-touch payment mode is compatible with one or more operating systems, wherein the one or more operating systems include Microsoft Windows, Mac, Linux, Android, Blackberry, iOS, and Windows Phone; wherein a one-touch payment service associated with the one-touch payment mode is free, wherein the one-touch payment mode includes a freemium mode.

23. The method of claim 20, wherein the mobile and wearable device is configured to act as one or more of the following: a mechanical hybrid smart watch, a smart watch, a digital computing glasses, a digital bracelet, a mobile interact device, a mobile web device, a smartphone, a tablet computer, a wearable computer, a calculator watch, a smartwatch, a head-mounted display, a personal digital assistant, a enterprise digital assistant, a calculator, a handheld game console, a portable media player, an ultra-mobile personal computer, a digital still camera, a digital video camera, a mobile phone, a feature phone, a pager, and a personal navigation device.

24. The system of claim 20, wherein the first user input includes touch engagement of the user with a display of the digital device; and
wherein the second user input includes touch release of the user with a display of the digital device.

25. The system of claim 20, wherein the analyzing is based on the time between the first user input and the second user input.

26. The system of claim 20, wherein the cloud-based voice changing unit is operable to create a play list from the multimedia types on the digital device and broadcast the created play list.

27. The system of claim 20, wherein the cloud-based voice changing unit is operable to slow down the recorded multimedia type without changing pitch of the recorded multimedia type.

28. The system of claim 20, wherein the cloud-based voice changing unit is operable to enable one or more of the following: making a voice chat with PC-to-phone applications, making a voice calls with PC-to-phone applications, making a song remix, and speaking over the Internet and soft-phone using customizable text-to-speech voices.

29. The system of claim 20, wherein the cloud-based voice changing unit is operable to work in real time while using voice chat.

30. The system of claim 20, wherein the cloud-based voice changing unit is operable to modify the recorded multimedia types by performing one or more of the following: correcting pitch of a vocal track, aligning vocal tracks together, fixing rhythm of a particular vocal line, applying a robotic effect to the vocal track, transposing a vocal track, adding backup vocals to the vocal track, reversing the effects of pitch correction, adding distortion to the vocal track, changing pitch-sensitive fundamental waves of voice in the recorded multimedia type, and morphing voice and suppressing background voice to obtain voice optimized for online games.

31. The system of claim 20, wherein the modifying includes modifying pitch, format, noise threshold, and applying echo.

32. The system of claim 20, wherein the cloud-based voice changing unit is operable to use electronic circuits to change or buffer unnatural sounds.

33. The system of claim 20, wherein the system is associated with one or more of a transactional payment based on Unstructured Supplementary Service Data, Short Message Service, direct operator billing, a credit card mobile payment, an online wallet, a QR code payment, contactless near field communication payment, a cloud-based mobile payment, an audio signal-based payment, a Bluetooth Low Energy signal beacon payment, an in-application payment, a software development kit (SDK) payment, an application programming interface (API) payment, a social networking payment, and a direct carrier and bank co-operation, wherein the system is compatible with a third party application, wherein the system is associated with one or more of an API and an SDK, wherein the system is further associated with a fingerprint touch recognition payment, a fingerprint press recognition payment, a gesture mark payment, a voice command payment, and a eye blink payment, a fingerprint swipe recognition payment, and a nod payment.

34. The system of claim 20, wherein the message includes a text, an audio, a video, and geographical data, wherein the message is sent to a controlled list of recipients, wherein the user sets a time limit for the recipient to view the message, wherein after the time limit the message is deleted from a mobile and wearable device associated with the recipient.

35. The system of claim 20, wherein the data network call is performed via a VoIP service.

36. The system of claim 20, wherein the VoIP service is provided via Wi-Fi, 3G network, 4G network, 5G network, 6G network or upper.

37. The system of claim 20, wherein the call includes an audio call, a video call, and a holographic video call.

38. The system of claim 20, wherein the receiving of the selection of the activity mode includes a voice command, a haptic interaction with a touchscreen, and a move command.

39. The system of claim 20, wherein the payment request includes a payment recipient, a payment amount, and user financial information associated with the user, wherein the payment recipient and the payment amount are received from the at least one mobile application, and the user financial information is stored on the mobile and wearable device.

* * * * *